(12) United States Patent
Brett

(10) Patent No.: US 12,630,368 B2
(45) Date of Patent: May 19, 2026

(54) SYSTEM AND METHOD FOR TUBE TRANSPORT

(71) Applicant: Kenton Brett, Indianapolis, IN (US)

(72) Inventor: Kenton Brett, Indianapolis, IN (US)

(73) Assignee: Kenton Brett, Indianapolis, IN (US)

( * ) Notice: Subject to any disclaimer, the term of this patent is extended or adjusted under 35 U.S.C. 154(b) by 264 days.

(21) Appl. No.: 18/310,495

(22) Filed: May 1, 2023

(65) Prior Publication Data

US 2023/0406639 A1     Dec. 21, 2023

Related U.S. Application Data

(60) Provisional application No. 63/439,045, filed on Jan. 13, 2023, provisional application No. 63/336,694, filed on Apr. 29, 2022.

(51) Int. Cl.
*B65G 1/137* (2006.01)
*B65G 1/04* (2006.01)

(52) U.S. Cl.
CPC ......... *B65G 1/1378* (2013.01); *B65G 1/0492* (2013.01)

(58) Field of Classification Search
None
See application file for complete search history.

(56) References Cited

U.S. PATENT DOCUMENTS 3,526,326 A * 9/1970 Castaldi ............... B65G 1/0435
414/273
9,505,559 B1 * 11/2016 Cai ..................... B65G 47/506

| | | | | |
|---|---|---|---|---|
| 10,815,055 | B2 * | 10/2020 | Overfield ............. | B65G 1/0435 |
| 11,999,564 | B2 * | 6/2024 | Moulin .................... | B65G 1/14 |
| 2018/0290830 | A1 * | 10/2018 | Valinsky .............. | B65G 1/0421 |
| 2020/0269283 | A1 * | 8/2020 | Ulrich ..................... | B07C 3/008 |
| 2020/0362559 | A1 * | 11/2020 | Hafner ................. | E04B 2/7405 |
| 2022/0267091 | A1 * | 8/2022 | Ota ........................ | B66F 9/0755 |
| 2023/0066277 | A1 * | 3/2023 | Zhan ........................ | B25J 9/023 |
| 2023/0406630 | A1 * | 12/2023 | Austrheim ........... | B65G 1/0464 |
| 2023/0415345 | A1 * | 12/2023 | Zizka ........................ | B25J 5/007 |
| 2024/0400302 | A1 * | 12/2024 | Guberman .............. | B65G 1/04 |
| 2025/0033880 | A1 * | 1/2025 | Moulin ................. | B65G 1/065 |
| 2025/0042658 | A1 * | 2/2025 | Siraisi ................. | B65G 1/0485 |

OTHER PUBLICATIONS

YouTube. (2012). A typical pipeline construction. YouTube. Retrieved Jul. 3, 2023, from https://www.youtube.com/watch?v=47yFvw0lJyw.

* cited by examiner

*Primary Examiner* — Joseph C Rodriguez
(74) *Attorney, Agent, or Firm* — Maginot, Moore & Beck, LLP

(57) ABSTRACT

A transport system for a container includes a shelf and a moveable carrier. The shelf includes a first platform and at least one first magnet. The carrier includes second platform and a plow with at least one second magnet. The carrier is configured to position the second platform adjacent to and parallel with the first platform. The plow is configured to move relative to the second platform between a first position and a second position. The container includes a first magnetic surface area and a second magnetic surface area, wherein the at least one first magnet of the shelf engages the first magnetic surface area when the container is positioned on the shelf, and wherein the at least one second magnet engages the second magnetic surface area when the plow engages the container. The plow is configured to move the container from the carrier to the shelf and vice-versa.

20 Claims, 12 Drawing Sheets

1

SYSTEM AND METHOD FOR TUBE TRANSPORT

CROSS-REFERENCE TO RELATED APPLICATIONS

This application claims priority from U.S. Provisional Patent Application No. 63/336,694 filed on Apr. 29, 2022, and also claims priority from U.S. Provisional Patent Application No. 63/439,045 filed on Jan. 13, 2023, the entire contents of which are incorporated by reference herein.

BACKGROUND

The general concept of transporting goods or people through tubes has been discussed since a least 1667, when Denis Papin shared his pneumatic tube ideas with the Royal Society of London. Since that time, there have been various tube ideas, experiments, and even successful niche applications, like vacuum tubes for bank drive-throughs and hospitals. Even recently, a number of companies have been working on new versions of this general idea, including Mole Solutions, Amazon (U.S. Pat. No. 9,505,559B1), and several hyperloop companies.

One version of the idea is point-to-point deliveries all over cities, using small trains on rails running through under-street tubes. Examples of this include Magway and Pipe Dream Labs. But after lots of investment, time, and effort, there are still no new solutions viably operating anywhere in the world. Perhaps we've been aiming too high, too quickly, and not weighing the costs and benefits of each approach.

The hyperloop test track near Las Vegas is short, slow, bumpy and hyper-expensive. It looks great, but the project was discontinued for reasons that many engineers predicted. At such speeds (Hyperloop Alpha is 760 mph), extremely straight tubes fare required for extremely long distances, to prevent severe buffeting and g-forces (proportional to the square of velocity). At 10 times highway speed, these forces would be about 100 times greater. Land is not flat, so bridges and tunnels would need to be very long, high, deep, expensive, and vulnerable to wind and earthquakes. There are other difficult technical hurdles too.

Some engineers and investors are also skeptical of the other tube projects being prototyped, for various reasons. For tubes going around cities, tremendous effort is required to work around existing infrastructure both above and below ground. Just obtaining all the permits would be daunting and expensive, with many stakeholders impacted. And these various proposals involve large diameter tubes, ranging from a few feet to 14', or more. Building and installing miles of such pipe is enormously expensive and pollutive; and there are many other issues with these current efforts. However, massive, problematic, expensive projects can, and do happen, given enough time, effort, skill, money, and tolerance for pollution and diverted resources.

But many past technologically great achievements have taught us that whenever possible, it is best to start with small scale, and more readily accessible goals. Recent tube transportation initiatives seem to be ignoring these two important lessons.

SUMMARY

"LTT" (Local Tube Transport) does not ignore the above-mentioned lessons, instead focusing on costs and benefits, and practical applications. LTT is one of several components of the current disclosure.

LTT circumvents the above mentioned issues, first by recognizing that the biggest delivery problems are "last mile", and then finding the last mile applications and scenarios best suited to prove the LTT concept, and learn for further development.

2. LTT uses much smaller pipe than others, which is a tiny fraction of the materials cost per foot, and a fraction of the installation cost and difficulty. This insight is simple: the vast majority of items shipped are small, allowing most of the last mile problem to be solved with LTT, at first using tube sizes possibly around 12-20".

3. LTT cuts costs still more, by first focusing on high-density housing, thereby dramatically cutting the length of pipe needed per capita, and cutting client-side decision makers and other stakeholders from potentially hundreds or thousands, to potentially one (the owner of a large apartment complex, or developer of a sub-division).

4. LTT also employs specially designed reusable boxes, with great advantages in efficiency, cost, waste and pollution. LTT is not exposed to weather, nor does it involve humans in its operation, so items need little or no single-use packaging. Yet with NFC tags, bar codes or data matrix codes, they can be quickly identified by robots; and can be easily inventoried, with permanent RFID tags on each box. The boxes are high quality, with more features, and still cost nearly zero per use, over their lifetimes. The largest boxes will safely fit in the tubes, but maximize use of space. As the reusable box system develops, it may lead to industry-wide package standardization, which in turn, could lead to other supply chain efficiencies, world-wide, and in many industries.

5. Leveraging the population density, LTT enables extremely fast delivery (1-5 minutes) from specially designed local storage and distribution hubs ("auto-hubs") to local customers through the on-site underground tubes, by using several novel components to capture valuable new efficiencies.

6. LTT uses a small, low weight battery-powered vehicle instead of a lengthy conveyor system moving lots of packages—solving a very different problem than Amazon's U.S. Pat. No. 9,505,559B1. 8 years after Amazon applied for its patent, its focus has instead been on drones, Scout, and electric Rivian vans that weigh 9000 pounds. LTT's 12 lb. electric carrier, unimpeded by traffic, weather, stop signs or people, is a better choice for last mile delivery.

7. LTT uses a cartridge system in the downstream end of the warehouse, and through the delivery vans, into the Cartridge Receiving Units (CRUs) at each LTT. The CRU is a portal where vans deliver large cartridges filled with items. All this can be automated, because of standardization of all the system's components, so no humans are needed, with the exception of the van driver. Delivery van aisles are big enough for people to bend over and pull out big boxes. But the cartridge system eliminates the wasted space in vans, and so greatly increases the effective delivery fleet. Each van can accomplish far more too, as cartridges transfer into the vans, and then out to the CRUs very quickly. Drivers will no longer deal with dogs, slipping on ice and puddles, concerns about theft from porches or the vans themselves, finding addresses, and hustling to get through their routes. No humans involved in loading or unloading trucks. Just pull up to the CRU, and everything is quick and automatic.

8. The small carriers bring orders to lockers in apartment building common areas, or directly into apartments or homes in minutes, or even seconds from the auto-hub, which is a short distance away, and can stock as many as 30,000 different SKUs in a very small volume, for several reasons described below. The carriers also deliver regular orders (non auto-hub orders) directly from the CRU (described next), and restock the auto-hub from the CRU.

9. LTT's scale makes it much greener to build than the tube systems mentioned above, costs less than 1% of the others, and takes far less time to install, allowing iterative development that can spread across applications and across the world quicker, for a faster and bigger impact on cost, efficiency and global emissions. Beyond the disclosures herein, there are certain ways to construct LTT at even less expense than would seem possible.

After the oil embargo in the 1970s, everybody was building electric vehicle prototypes. But they were missing a number of insights and innovations, and it was 35 years before EVs were successful in the market. Tube transport may be at a similar inflection point. We now have the technological components available, but we need better novel ideas for design, application, implementation, engineering, construction, financing and marketing. Then finally we can have the first quantum leap in viability of tube transport in decades.

That is what LTT is aiming for. And beyond LTT, the current disclosure also includes RTT (Railroad Tube Transport) and UTT (Utility Tube Transport). Eventually lessons learned from implementing these may contribute to solving the problems of HTT (Human Tube Transport, which hopefully won't be too many years in the future). The grand vision is to connect everything that is rational to connect with tubes.

LTT in more detail: Considering preliminary cost analyses, there seems to be a variety of logical applications for LTT that are already feasible. One of those is large existing apartment complexes, which in some cases have over 10,000 apartments in scores of buildings on a single plot of contiguous land. Another application is new apartment complex construction, which would be easier and cheaper than retrofits, and should be much better for building direct delivery to individual apartments. There are also many urban areas where several different apartment complexes are located adjacent to, or near each other, and not far from clusters of retail establishments; where multiple LTTs can connect with each other. Once LTT is implemented in these applications, lessons will surely be learned that can help with development in other applications, such as hotels, dorms, dense subdivisions of condos, retirement communities, and eventually to most any subdivision, even retrofitting existing ones.

The above described features and advantages, as well as others, will become more readily apparent to those of ordinary skill in the art by reference to the following detailed description and accompanying drawings. While it would be desirable to provide an LTT (or other tube transport system) that provides one or more of these or other advantageous features as may be apparent to those reviewing this disclosure, the teachings disclosed herein extend to those embodiments which fall within the scope of the appended claims, regardless of whether they include or accomplish one or more of the advantages or features mentioned herein.

DESCRIPTION

Figure 1:
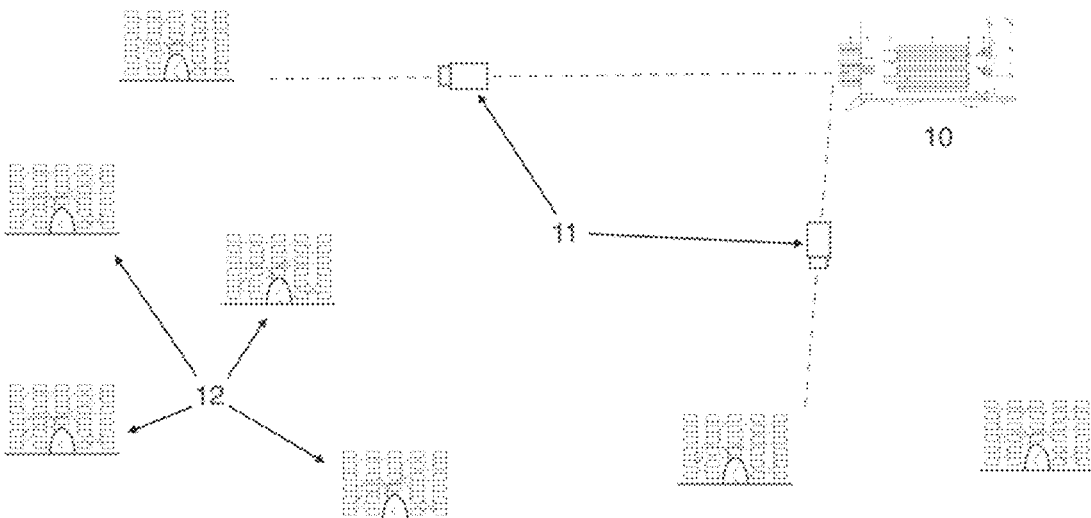
FIG. 1 is a simplified schematic illustration of a city-wide Local Tube Transport (LTT) system.

Amazon has changed the way many people buy things online. Especially Prime customers, often order a single item at a time. And often that is how customer needs arise-one at a time. So single-item orders are extremely convenient and natural for people, but they produce large inefficiencies in packaging and delivery. In at least one embodiment, LTT is a solution intended to remove most of these inefficiencies, without losing the convenience. In fact it raises the convenience to a whole new level. So LTT might dramatically change the way consumers live and shop. The concept will be fertile ground for marketing and sales ideas, and a fantastic branding opportunity for sellers, apartment complexes, developers, municipalities and others.

Ideally, new ideas should be several times better than the status quo. Quantifying that for LTT, would seem impossible at this early stage, but a thought experiment may help demonstrate the limits of what may be possible. If a single mom has a baby with a fever at 3 am on a winter day, and she needs Baby Tylenol, one option is to bundle up her baby, and take it out to her cold car, and drive to the nearest 24-hour pharmacy. But with LTT, it can be possible to have it delivered to her in minutes, or even seconds.

For this example, the numbers are so good, they seem unreal. In scenario A, if her 3000 lb. gas car runs for 30 minutes, but in scenario B, the 12 lb. electric carrier runs for only 1 minute, then LTT is 60,000 times as "green"[1]. Also, her wait time is 30 times shorter; and not taking her baby out to the cold car is an immeasurable benefit (but let's say it's only 10 times as helpful for her). So how much better is LTT in this case? 60,000 times greener, 30 times faster, 10 times more convenient. 60,000×30×10=18 million times better than the status quo. Of course, this is simplified, and it's just one specific case. But in nearly all cases, the benefits will be very high.

a. afdc.energy.gov/vehicles/electric emissions.html says gas cars emit 8 times the carbon as battery-electric in NY (select NY, then on the bar graph, mouse-over the "All electric" bar and the "Gasoline" bar to see the CO2 for each, then divide to get 8.0).

i. So (3000×30×8)÷(12×1)=60,000.

ii. Her order is placed at 3 am, when the auto-hub is not busy, so 1-minute delivery is reasonable.

How does LTT work? From the user perspective, it is nearly the same as online ordering from Amazon or Walmart or whatever seller is operating their LTT. The items available for super-fast delivery (from the local auto-hub) are separately categorized and clearly marked for users to distinguish from other items. Whatever you order will be delivered via your LTT network, whether from the auto-hub, or not. The only restriction is, it must fit in the LTT tube. Otherwise, it will be delivered by traditional means. By design, the LTT tubes will be large enough for the vast majority of items that customers typically order.

Auto-hubs are very different from warehouses, DCs (distribution centers), Amazon's FCs (Fulfillment Centers), and the like. Auto-hubs are on-site, completely unmanned, and contain far more SKUs than a warehouse of equal size, because: 1.) The quantity of each SKU is small, yet continuous restocking from a warehouse prevents stock outs. 2.) It only stocks popular items-which warehouses would store hundreds or even thousands per each SKU. But the auto-hub may stock only 2 or 3 of each SKU, requiring a tiny fraction of the space. 3.) The aisles are only wide enough for the small robots. 4. It only has items that are small to fit in the tubes, and take up less shelf space. So an auto-hub might stock 1000 times or more SKUs per cubic yard, than a "normal warehouse".

Robots pick the items, in their reusable boxes ("R-boxes"), and carry them quickly through the tubes, securely delivering to lockers, from the back. Customers access the lockers from the front, retrieve the item, and that SKU is then flagged for restocking to the auto-hub. A locker may be in a common area of an apartment building, or inside a home or apartment. The lockers in common areas require customer authorization for access, such as a code on a cell phone. A locker inside a home or apartment can either be the same (requiring a code), or it can have low security customer access, once the delivery is complete. For safety, the low security access may still prevent access during the actual mechanical delivery.

Vans from the warehouse, DC or FC pull up to the CRU (again, Cartridge Receiving Unit), and cartridges full of items are automatically transferred to the CRU from the van.

Ideally the CRU is adjacent to the auto-hub. In places where that isn't possible, underground tubes connect the CRU to the auto-hub. Once the cartridges are delivered, the robotic carriers take newly delivered "restock items" through the tubes, from the CRU to the auto-hub to be stored, and also deliver other orders from the CRU to the lockers for customers to retrieve. If an apartment building's lockers are full, items can be temporarily stored in the auto-hub. This dramatically reduces the number of lockers needed. In fact, delivery is so fast, that delivery can wait until customers say they're ready (on their phones or computer apps). So very few lockers are needed to serve even the largest apartment buildings.

LTT's wheeled robotic carriers can be cheap, reliable, durable, efficient, and easily removed for inspection, service, upgrades or replacement. But they might not actually do the picking, as there are special features that can make custom "picker bots" better suited for this task. The carriers park at a precise spot, and a picker loads them. For picker accuracy, pickers are mounted on a carriage that uses Cartesian coordinate location using stepper motors and rails. Similar to 3D printers, CNC mills, and waterjet cutters, linear rods or linear rails (linear motion guides or linear slides), which may have carriages with V-slot rollers, can quickly move the picker into any precise location on the shelf grid. Because of the popularity and advances in 3D printing, this technology has gotten better and cheaper. Motors, T-slot extrusion, and other components of the printers are mass-produced and inexpensive, and can be quite useful in LTT, for the design of the travel mechanism for pickers to place and pick items.

In the preferred embodiment, a large version of a Cartesian 3D printing frame and carriage is installed sideways onto a shelf unit, with a picker mounted to the carriage. The boxes can simply be pushed onto or pulled off a shelf. For smooth transition when placing a box, the picker's interior shelf can be very slightly above the receiving shelf. Conversely, it positions slightly below the shelf for picking a box. The smooth transition is also accomplished in other ways, as discussed below.

The same technology that automates LTT, can also automate auto-hub fulfillment back at the regional warehouse, DC or FC. Auto-hub items are placed into the R-boxes and stored in a large auto-hub within the regional warehouse, DC or FC. This is a buffer for stock at LTT auto-hubs, and enables cartridges to be quickly and automatically filled for the next deliveries to the LTT auto-hubs. So no humans are needed after the original boxing, clear through the point of delivery to consumers. Cartridges have many cells of certain sizes, but each cell can also accept smaller boxes. LTT should allow other efficiencies to be gained by skipping the ship sorter, ship dock, delivery station and sort center.

FIG. 1 is a simplified illustration of a city-wide LTT system, when it has grown to include 7 apartment complexes, "L". Each apartment complex has its own LTT with an auto-hub, which serves all apartments within its LTT range. Delivery vans "V" bring cartridges full of items to the complexes L, from the warehouse auto-hub "W", which is attached to a standard warehouse that may be new, or may have been in existence for a long time. Each of these components (L, V, and W) are described in more detail below.

Figure 2:
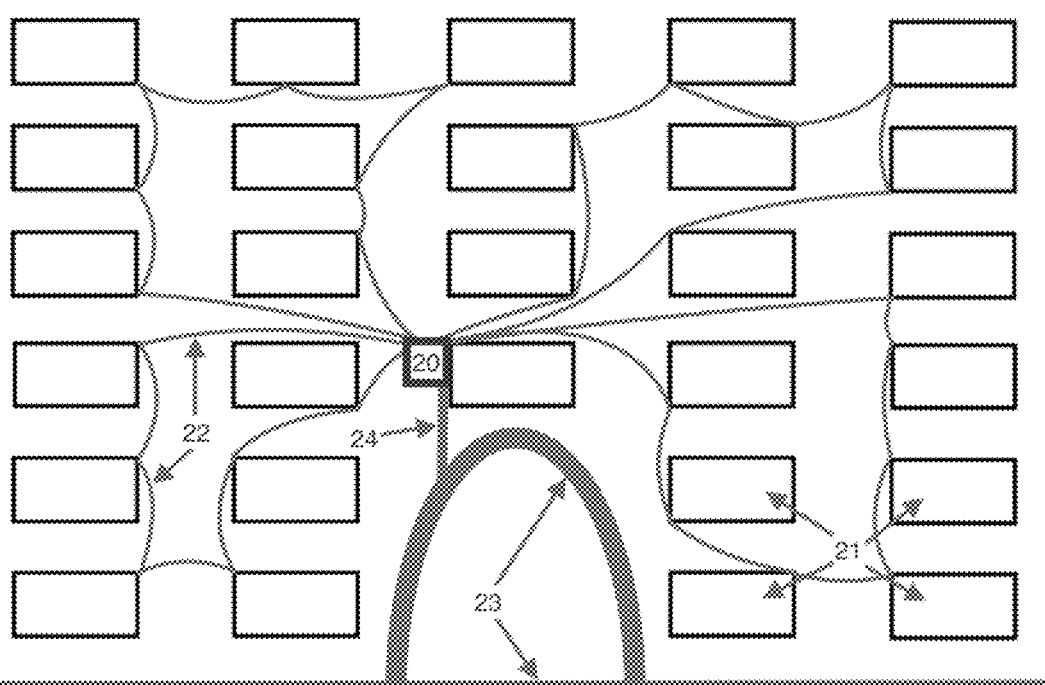
FIG. 2 is a schematic illustration of a complex of 28 apartment buildings B, with an auto-hub A connected to a central apartment building.

FIG. 2 illustrates a complex of 28 apartment buildings B, with an auto-hub A connected to a central apartment building. The auto-hub A stocks thousands of small items, which can be delivered in minutes, or even seconds to residents within this LTT. The auto-hub A is restocked from vans, which deliver cartridges containing 2 types of items: items for restocking the auto-hub, and customer orders for non-auto-hub items (items not stocked in that particular LTT auto-hub). A van from the warehouse arrives on roads "D", and utility lane "E" to interface with the auto-hub A, where it exchanges full cartridges for empty cartridges. The transfer is quick, the van heads back to the warehouse, and LTT carriers begin unloading the new cartridges. Customers are notified that their orders have arrived. When a customer responds that they're ready to take delivery, a carrier retrieves that item from the newly delivered cartridge, and delivers it using underground tubes laid out in loops, such as loop "C". In this example, 4 loops go out from the auto-hub, with each loop delivering to 6 or 7 buildings.

The carriers also restock the auto-hub A from the newly delivered cartridges, but current orders take priority. If there are current orders still remaining in the cartridges when another delivery van is coming, the carriers need to prepare for the delivery, either by: 1. Moving those unclaimed orders to the auto-hub shelves. Or 2. Moving the unclaimed orders to one of the cartridges, so that the other cartridges are empty and can be taken by the van. Or 3. Deliver the orders anyway, and send more notices to pick up your item. (This assumes there are plenty of locker cells available at the destination building, although other lockers can be used for temporary storage too). Or 4. Leave the items in the cartridges to be returned (but only if the customer has had plenty of time to respond). Note: "empty cartridge" means a cartridge full of empty boxes.

The LTT in FIG. 2 allows delivery from vans directly to the auto-hub, which is the preferred method. However this may not always be possible, especially when retrofitting LTT into an existing apartment complex. The best location for an auto-hub might not be easily accessible to vans. If that is the case, a CRU (Cartridge Receiving Unit), which is much smaller than the typical auto-hub, can be built in a location separate from the auto-hub that is accessible to delivery vans.

Cartridge Receiving Unit (CRU)

A key part of LTT is the cartridge system. Today's vans have aisles big enough for a person to bend over and pull large boxes from shelves. The cartridge system doesn't need people in the van's cargo area. So it eliminates that wasted space, effectively increasing the delivery fleet without buying more vans. And while the fleet delivers more in each van, the vans also travels fewer miles to do so, since each will only travel to one or a few LTTs before returning for more. And loading each van at the warehouse is much faster, simply swapping loaded cartridges for empty ones. Currently, nighttime delivery to customers is very rare, for several reasons, including driver security, porch piracy, and residence security and disruption. But the LTT system has none of these issues, so night delivery is possible. In big cities, traffic is much lighter at night, so delivery of cartridges is much faster. So with this component of the disclosure, the major advantages are:

More orders per van.

Delivery to very few destinations (often just one)

Loading and unloading in seconds

Night delivery makes travel much faster 24 hour delivery utilizes vans much more.

These advantages compound, and in some cities, they may effectively quintuple the productivity of vans that are switched to LTT.

Ideally the CRU can be adjacent to, or a part of its auto-hub, since many incoming items will go onto auto-hub shelves, either as stock items, or as orders waiting for customers to signal they're ready for delivery. However, it may be difficult in some retrofit situations to build the CRU and auto-hub together. For stand-alone CRUs, to maximize security and minimize weather entering the CRU, it can be good to borrow some common features of standard truck loading docks, like bumpers, indicator lights, and dock seals or shelters.

Figure 3:
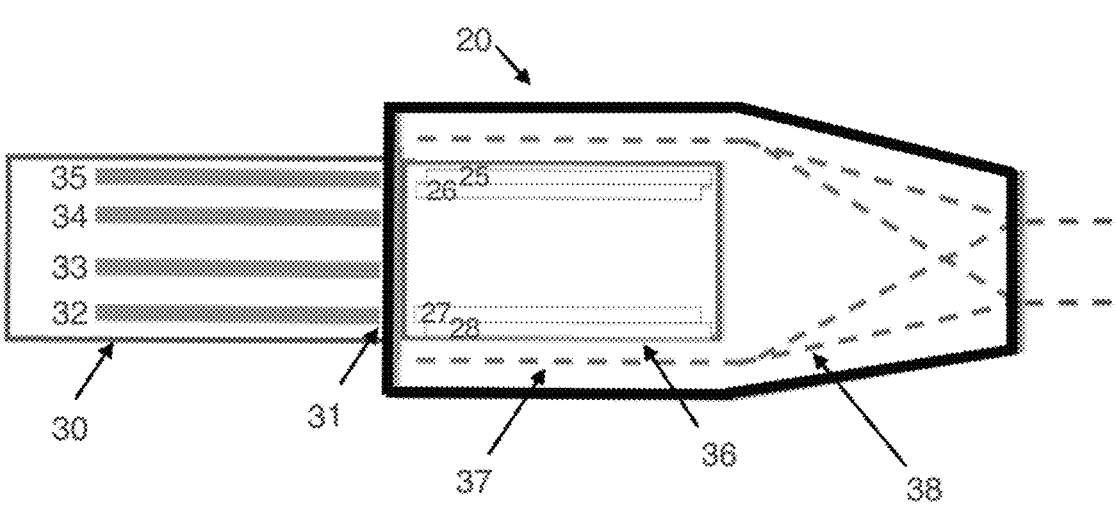
FIG. 3 is a diagram of a Cartridge Receiving Unit (CRU) exchange system.

As diagrammed in FIG. 3, the delivery van V backs up to the dock D, the van cargo doors and dock doors open, and the cartridges are exchanged. It may be preferable for both the van and dock doors to be roll-up doors. The full cartridges 1-4, glide or roll off the truck, into the above-ground portion of the CRU (rectangle "A"), and are lowered to the CRU basement B, where boxes are transferred from the cartridges to the carriers, which travel underground to the lockers or auto-hub.

Different vans can hold different numbers of cartridges, of various sizes, and all cartridges will work with any CRU, since the cell patterns of all cartridges are the same. Or, in another embodiment, cartridges can have different cell configurations, but any carrier or picker that interacts with the cartridge can read the cartridge's attached code to know which type it is, and where each cell is. Or, in another embodiment, the carrier simply travels to the next code printed on each cell it finds, in order to locate the next cell to pick or place.

FIG. 3 is one embodiment for a CRU that is not adjacent to its auto-hub. In this example, the truck is delivering 4 full-sized cartridges, and all 4 are destined for this CRU. In this example, the CRU has 4 cartridges containing empty boxes (#5 & 6 on the main level, and #7 & 8 in the CRU basement B). Cartridges 2 & 3 move from the truck into the above-ground portion (rectangle A) of the CRU, and then down to the basement B. Next, the 2 upper empty cartridges 5 and 6, in the CRU move to the center of A, then into the truck at positions 2 & 3. Then the 2 lower empty cartridges 7 and 8, move up from the basement, then to the center of A (to make room for cartridges 1 and 4). Cartridges 1 and 4 then move into A, and then down to the basement. Finally empty cartridges 7 and 8 move out from the center of A, then into the truck position 1 & 4, completing the transfer.

Next, the doors of the van and CRU are closed, and the van continues on its route (in this case, back to the warehouse). Then customers who have items just now delivered to this CRU, are notified that their orders are ready. When customers respond that they are on their way to their lockers, carriers take their orders to the designated locker cells. Delivery priority goes to those customers who respond first. To prevent an overwhelming number of simultaneous responses, the notifications can be metered if necessary, based on historical customer response patterns. Also notifications can be sent to customers in scattered locations, to disperse tube traffic.

In times when no customers are responding, carriers deliver auto-hub restock orders from the CRU to the auto-hub for storage. But as soon as a new order or pick-up notice comes in, those current orders take priority, and the carriers delivering those orders will have right-of-way over other carriers. Carriers enter the CRU basement from a tube, and follow a path (dotted lines P) to the right or left side of the basement, to a level track near the top of the basement, where it can pull a box from the top row of the cartridge. Cartridges are raised or lowered to present priority orders to the carriers until all priority orders are delivered. When the outer cartridges are emptied of priority orders, they will "leap frog" the inner cartridges, as all cartridges are in the rail system that moves them up, down, left and right. The CRU may be very busy at times, so the carriers may enter and exit through different tubes to minimize traffic.

When priority orders are not being summoned, the carriers deliver the restock items from the cartridge to the auto-hub, until level by level, each cartridge is emptied. Most times that a carrier retrieves an order from a cartridge, it first places an empty box into an empty cartridge cell. If there are a few unclaimed orders left in cartridge cells, an algorithm determines what to do. There are several reasonable options. The carriers can combine the orders into 1 or 2 cartridges, so that no further leap-frogging is necessary. The carriers can store the orders on shelves in the auto-hub. They can deliver the orders to the destination lockers, if there is plenty of locker space available, or several other options. Instead of this staged raising and lowering of cartridges, picker-bots on picker travel frames can be used to accomplish the picking task.

CRU lengths can vary, but they are standard lengths, and ideally all CRUs can accept the longest cartridges. If this is not possible at a particular location, the CRU can either be wider to accommodate more short cartridges at once, or deliveries can be made more frequently. Even auto-hubs that are accessible to delivery vans will need a CRU for the delivery interface. Presumably most or all CRUs that are adjacent to, or a part of their auto-hubs, could be full length to accept any size cartridge, since all auto-hubs should be longer than any cartridge.

CRUs can also contain "upload ports", where authorized local merchants, businesses, US postal workers, or other authorized persons can securely insert standard R-boxes to be delivered anywhere within an LTT, or a connected LTT (more on this later). For example, a customer within a certain LTT can order a cake from a local bakery that is certified to use that LTT, or can use a certified delivery service. The cake delivery is made into the CRU portal, instead of driving clear to the apartment building, and parking, while making the delivery on foot.

The WAH (Warehouse Auto-Hub)

Figure 4:
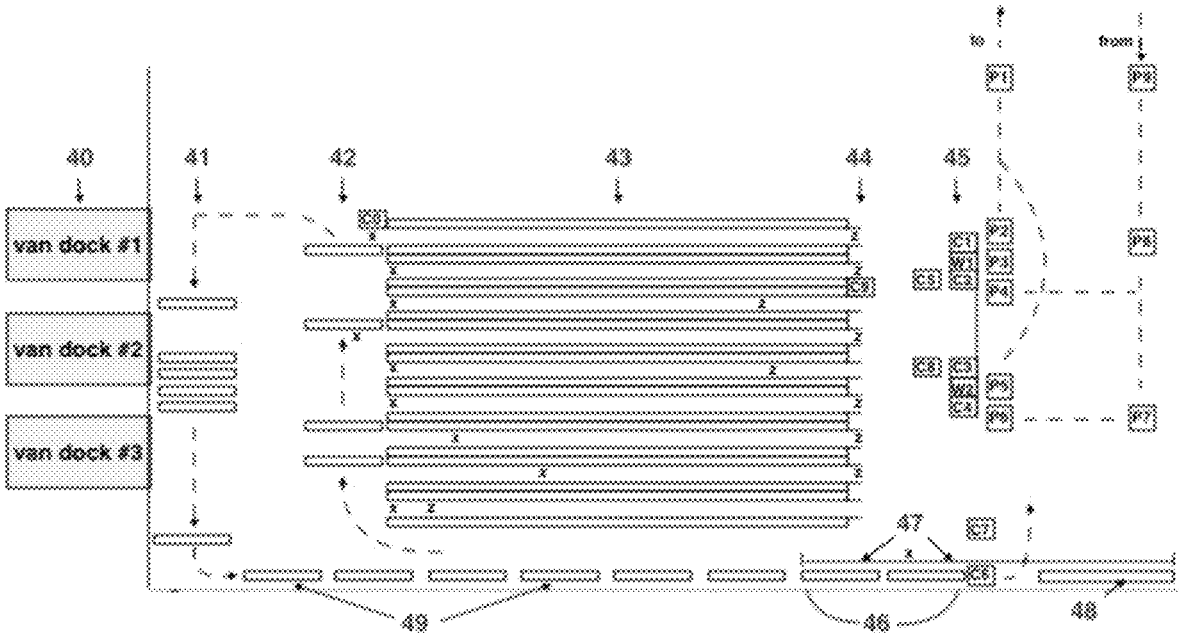
FIG. 4 is a schematic illustration of a Warehouse auto-hub (WAH) system for handling cartridges.

The WAHs are built to quickly and efficiently serve the LTT auto-hubs. FIG. 4 is one embodiment of an auto-hub at a warehouse (WAH). This is where the products are placed in the reusable boxes (R-boxes), stored on the WAH shelves, then later retrieved to be placed in cartridges, which are then loaded into the vans going to the LTTs, then brought back to the warehouse, full of empty R-boxes, which will be reloaded with products again.

For illustrative purposes, FIG. 4 also shows the interface to the warehouse. But different warehouses use different nomenclature and methods. For illustrative purposes only, FIG. 4 uses Amazon's nomenclature and methods. For example, Amazon uses storage pods, which are large yellow mobile shelf units that are lifted and moved around the FCs (Fulfillment Centers) by robots. So this figure depicts the FCAH (Fulfillment Center auto-hub), which is the auto-hub at the FC.

Most elements in FIG. 4 are labeled by column. Column 40 shows 3 loading docks for vans. These are typical docks, here shown with no vans. The cargo bays inside the vans have slots in the floor and ceiling, which the cartridges glide into and lock into place for the journey. The docks' height allows the cartridges to insert right into these slots automatically. Column 41 is where the loaded cartridges await the vans. In this example, a group of 4 cartridges have been loaded, and are waiting for a van to dock at dock #3. When the van arrives at dock #3, its cartridges filled with empty boxes will be unloaded, and move down, while the 4 full cartridges move down into position for loading into the van at dock #3. There is also a full cartridge ready and waiting at van dock #2, while more cartridges are in the process of being loaded for van dock #2. Van dock #1 has no cartridges ready yet.

Cartridges can be moved by people, or by special robots that lift and roll them. But the cartridges will move in single-file progression in a well-defined path, so the preferred embodiment is an automated overhead rack system with rails. So, for example, if full cartridges are ready and waiting for all 3 docks (which would be 12 cartridges total), and then a van is loaded at dock 3, and dispatched; then the remaining 8 full cartridges can be automatically advanced forward to docks 2 & 3, making room for additional cartridges to be filled and queued.

Column 42 shows cartridges that are being filled from the shelves, which are in column 43, by robotic pickers x. When a cartridge needs to be filled with items for delivery, it is moved to the end of the auto-hub shelf containing the items needed, where it sits in the range of the Picker Travel Frame that serves that shelf unit. So in effect, the cartridge temporarily acts as part of the shelf unit, while the picker loads it. This way, the Picker Travel Frame needs no special features to load cartridges. The picker retrieves the first boxed item from the shelf, moves to the cartridge within the Picker Travel Frame, inserts the item into an appropriate-sized cell of the cartridge, then moves back to the shelf to retrieve the 2nd item, and so on. FIG. 4 shows 2 pickers x currently loading cartridges (in column 42, while 2 pickers x are picking items from shelves, and the other 5 pickers are waiting for tasks (at the left end of the shelves).

Usually, when a cartridge is being loaded, it will need to "visit" several shelf units. But the number of these visits can be minimized, by filling each of the cartridges on a particular van, from as many "same shelves" as possible. For example, when it's time to start filling the four cartridges for van dock #3, let's say some items will be needed from every shelf unit in the FCAH. But there may be no need for each of the four cartridges to visit every shelf. Instead, one cartridge can be filled from one or a few shelves, while another cartridge can be filled by visiting one or a few different shelves. The picker will continue to load from that shelf unit, until the cartridge is full, or until the cartridge needs no more items from that shelf unit. Then the cartridge is moved to another shelf unit for more loading: or if the cartridge is full, it is moved to its loading dock position.

To the right of the shelf units, is the packing station, shown under column 45. This is where items are loaded (either by people or robots) into the R-boxes. In column 45, there are carrier stalls and worker stalls. There are 2 workers, each loading carriers that pull in beside them both to the left and right. Storage pods are coming in from the main FC ("from") to the packing stations in column 45, while other Pods are going back to the FC ("to"). Pods 1 and 2 are on the way back to the FC, and Pods 8 and 9 are coming in from the FC. Dotted lines show the Pod routes. Pod 3 is in front of worker 1, who is picking the product from Pod 3, to place in the R-box in the next carrier. Then Pod 3 will go back to the FC, and Pod 4 will take its place, while another carrier pulls in.

From the packing stations in column 45, the carriers take loaded boxes to the shelf units in column 43, where a placer z will receive the box from the carrier and put it on a shelf. Column 44 shows extensions protruding from the right ends of the shelves. This is an extension of the picker travel frame, where the carriers park to transfer the items to the placers. These picker travel frame extensions allow both pickers and placers to work on the same shelf unit at once, yet each has access to the entire shelf. So while one picker is loading cartridges on the left end of a shelf unit, a placer z can place a newly-filled box anywhere on the same shelf unit.

The pickers and placers, perform the same motions, and thus can be the exact same robots performing 2 different functions. They are programmed to work in tandem, so they never collide, and yet they can work about twice as fast as a single picker. All storage shelves in FIG. 4 have similar picker travel frame extensions out to the left, for loading cartridges, but the extensions are not shown in this drawing, in order to minimize clutter.

In the 2nd aisle from top, a carrier is delivering a newly filled box to the placer. Only one picker and one placer are needed in each aisle, as they are on swivel mounts, and can pick from shelves on both sides of the aisle. After a carrier has delivered a newly packed R-box to the shelves, it goes to retrieve an empty box at the cartridge emptying station 46, shown near the bottom of FIG. 4, here containing 2 cartridges that are being unloaded. A carrier is parked in the slot to receive an empty box from the picker, which is within the picker travel frame 47. Whatever item is next in line to be packed at the packing station, has an ideal box-size associated with its SKU, so the picker at this cartridge emptying station 46 finds a box of that size in one of the cartridges being emptied, and loads it onto a carrier, which takes it to the packing station in the correct stall at the correct time to pack the correct item. Carriers move out to the right (shown by the dotted line), making room for the next carrier to pull into the receiving slot within picker travel frame 47.

When a SKU is originally entered into the LTT system, it is automatically scanned for size and shape, and judged by humans and/or artificial intelligence to rate it for fit in one of the standard box sizes. From then on, that SKU is associated with that box size.

Non-WAH orders: In FIG. 4, a carrier is parked to the left of the first shelf, across the aisle from a cartridge. That cartridge is destined for an LTT where a customer ordered an item small enough for LTT, that is stocked in this main warehouse, or another warehouse, but not stocked in their local auto-hub or this WAH. That order was brought to the WAH (in this example, by a pod), put into the RBox in a carrier, and taken by the carrier directly to the cartridge (instead of storing it on a WAH shelf). This carrier cannot rise to place the item into a cartridge cell. Instead, the picker takes the item in its Rbox, from the carrier, and transfers it into the cartridge. If that particular item gets ordered more frequently, it may qualify to be stocked in this WAH. And if it gains even more popularity, it may qualify to be stocked at one or more LTT auto-hubs too.

In the WAH layout of FIG. 4, the left end of the first shelf is in the preferred location for transferring non-WAH orders to cartridges, because it is closest to the packing station, and the carrier did not cross any cartridge paths to get there. But any of the shelf pickers x can perform this transfer function, so there are 9 aisles in FIG. 4, where these transfers can be made. If more than 9 are needed, there are several acceptable locations where more transfer stations can be added, In order to minimize clutter, not all carriers are shown in FIG. 4. There are other carriers, also following prescribed paths, going to and from the positions shown (cartridge emptying station, packing stalls, and shelves). There can be built-in charging stations at all the most common places for the carriers to wait-in the parking areas and stalls, or induction charging or floor rail charging, as in the LTT auto-hub discussion.

If a cartridge at the cartridge emptying station 46 is nearly empty, but its remaining empty box(es) are not currently needed, those boxes can be temporarily stored on the overflow shelves 48. Again, the picker simply picks the remaining empty box(es), and places them on the overflow shelves 48, as the picker travel frame extends to include overflow shelves 48. Now the cartridge is empty, and can be moved away, to be reloaded. Then another cartridge moves into the cartridge emptying station 46, from the waiting line of cartridges 49.

In the preferred embodiment, overflow shelves 48 are actually above the cartridges in emptying station 46, so the picker does not travel as far, nor interfere as much with the carriers. Also, putting the overflow shelves 48 above the cartridges, makes room for a newly emptied cartridge to move out to the right, making way for another cartridge to enter the emptying station from the waiting line of cartridges 49. Also, the emptying station 46 can be larger if desired, simply by extending it to the left, to include 3 or more cartridges from the waiting line of cartridges 49.

As a last resort, if there are no more correct-size boxes in the cartridges at the emptying station (or there is predicted to be a near-term shortage of the correct-size boxes), the picker may decide to pick a box of the next-larger size instead. However, this situation should be rare.

One efficiency advantage with the Pods going to the FCAH, is that the FCAH can be restocked with several of the same SKU at once. Relative to LTT auto-hubs, which are in densely populated areas, the FCAH has less limitations on space. So there can be 10 or 20 or more of some SKUs, pre-boxed and stored in the FCAH, if it is serving several LTTs. So when it's time to restock a certain SKU in the FCAH, the Pod containing that SKU can travel once, to deliver many items, unlike today's status quo, where Pods often travel to deliver a single item to the packing station.

As the FCAH grows (from serving more LTTs, and each LTT gaining popularity), another efficiency can be gained. When the most popular items in the FCAH are stored in high enough quantities, it makes more sense for those SKUs to be shipped directly from incoming semi-trailers to the FCAH, completely bypassing the Pods and the main FC storage area.

As the LTT system grows, and WAHs get busier, there are other possible efficiency gains in the speed of loading cartridges and storing boxes on WAH shelves. One minor speed improvement can come from mounting the picker magnets on springs or cushions (or both), so the arms can quickly make contact with a box, without hitting it hard. Of course stepper motors will aid in this objective too, with their high degree of control.

Multi-Cell Pickers

A larger efficiency gain can come from the pickers picking several items before loading them into the cartridges. The WAH shelf units can be very large, and since the items are typically small, there can be thousands of SKUs on a single shelf unit. Therefore a picker can be tasked with retrieving several SKUs from one shelf unit for the particular cartridge it is loading at the time. Instead of making several trips back and forth from the shelf to the cartridge, the picker can pick several boxes in succession, before traveling down to load them in the cartridge.

Figure 5:
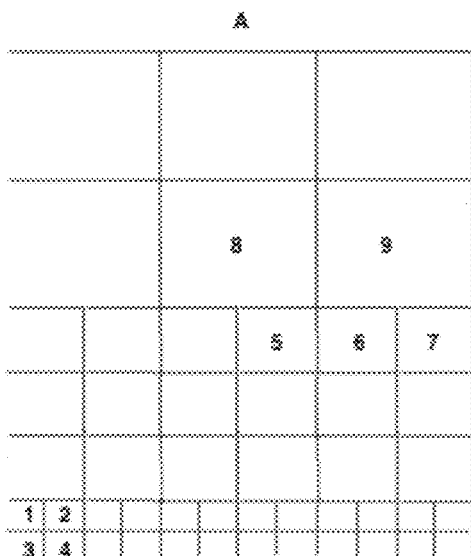
FIG. 5 is a side view of a cartridge with cartridge cells.
Figure 5:
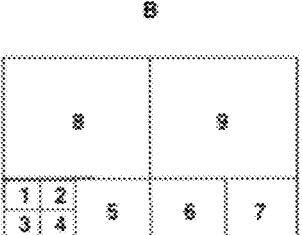

The cartridge cells may be sized and arranged similar to FIG. 5A. (For illustrative purposes only: The preferred cartridge has more cells than this). The simplified example of FIG. 5A has 6 large cells, 18 medium cells, and 24 small cells. Note the large cells are on top, and the small cells are on bottom. FIG. 5B is a picker having small, medium, and large cells, each with the mechanisms for picking (plow, carriage, magnets, push tape, etc.), which enables each cell to pick or place independently. FIG. 5B illustrates a picker with 9 cells: 2 large cells, 3 medium cells and 4 small cells, although other configurations can be used.

If, for example, the cartridge of FIG. 5A is empty, and ready to be filled, and is moved to the first shelf unit for loading, and if that shelf unit has at least 9 items needed by the destination LTT, including at least 2 large boxes, at least 3 medium boxes, and at least 4 small boxes, then the picker will travel to 9 locations on its shelf unit to fill its entire grid of 9 cells (FIG. 5B), choosing an efficient path to those 9 items, before traveling down to load the cartridge of FIG. 5A, which is still completely empty. So the picker first travels to a position where 5 items can transfer all at once. Specifically, items #5-9 in the picker will transfer simultaneously into the cartridge cells 5-9. Next, the picker aligns the items 1-4 with the lower left corner of the cartridge, so these 4 items in that corner can transfer simultaneously.

This represents a large time and energy efficiency gain for picking and loading these 9 items. But now the cells in the cartridge are less wide open, so the next items may not be transferred to the cartridge as efficiently. It will require at least 3 steps. As the cartridge continues to fill up, the multi-cell picker becomes less efficient. By the time the last few cartridge cells are being filled, the picker may be transferring only 1 item at a time, especially if the cartridge needs to be loaded from more than one shelf unit.

Due to the configuration of this exemplary picker, the top shelves in the WAH are reserved only for large boxes, and the bottom shelves only for small boxes. That way, this 9-cell picker can reach shelved boxes down to the lowest level (small boxes), and also the highest (large boxes), even if the shelves go clear from floor to ceiling.

So the picker can pick anywhere from 1 to 9 boxes before traveling to the cartridge, and then deliver all those boxes into the cartridge before returning to the WAH shelves to pick more. So efficiency is gained from eliminating round trip travel for each item, and also by taking an efficient route from item to item, and also from transferring multiple items at once into a cartridge.

Another embodiment of this disclosure involves raising the entire cartridge along with the picker directly behind the cartridge, and moving it to where the next item is located on the WAH shelf, with the cartridge having modified shelves which allow the picker to extend its plow magnet clear through the cartridge shelf, and into the WAH shelf to obtain an item, and pull it onto the cartridge shelf. This process could be somewhat faster, but may require heavy duty equipment, and other special considerations. Another embodiment of this idea is to break the cartridge into smaller modular sections which are raised along with the picker using the same method. Each section of cartridge would not be as heavy and bulky, but the assembly and disassembly of each cartridge may not be worth the efficiency gains. So instead, the preferred embodiment uses the method outlined in FIG. 4.

Of course, the multi-cell pickers can gain the same efficiencies on the placing end of the WAH shelves (column E of FIG. 4). A multi-cell placer using the FIG. 5 configuration can gather boxes from as many as 9 different carriers, before traveling up to place the boxes.

When WAHs grow to serve more LTTs, they will be stocking larger quantities of each SKU. As mentioned above, products can be brought directly from semi-trucks to the WAH, and many of the same SKU can be loaded directly into the R-boxes. A modification can be made to some of the carriers, so they can carry multiple boxes. For example, a carrier might bring 10 small boxes to a packing station, where a worker grabs a big handful of items (all the same SKU), and quickly drops one in each of the 10 boxes. That carrier's internal shelf modification allows it to interface with the multi-cell placer, which collects all 10 boxes at once from the carrier.

At another point in the growth of a WAH, it may make sense to add truck receiving bays, so semi-trucks deliver entire loads directly to the WAH.

Figure 6:
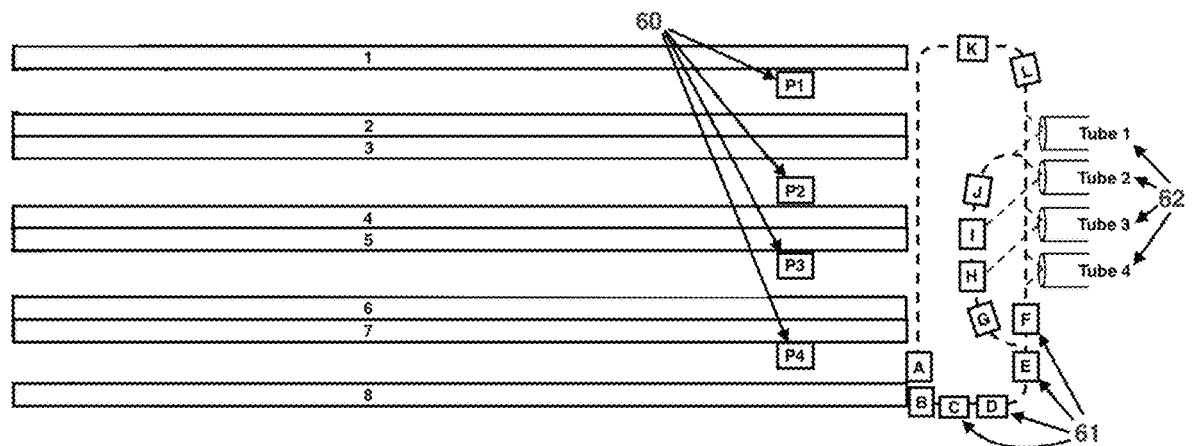
FIG. 6 is a plan view of an LTT auto-hub illustrating movement of carriers within the auto-hub.

FIG. 6 is an overhead view of an LTT auto-hub. In this example, there are 8 shelf units, 4 pickers 60, and 12 carriers 61 shown, with more that are out making deliveries. There appear to be only 4 tubes 62, but it depends on how you count. In this example, tubes make loops out to some of the various buildings in the apartment complex. Each tube has a wye not far from the auto-hub, with one wye branch exiting to the loop, and the other wye branch returning from the loop. There is no CRU adjacent to this auto-hub, so one of the 4 tubes goes out to the CRU instead, and it may also wye not far from the auto-hub, to allow simultaneous 2-way travel to and from the CRU, unless the CRU is very close, such that 2-way carrier traffic gains little efficiency. In this example, all dotted lines are carrier paths. Since these paths are in the auto-hub, they are electrified, so that any carrier in the auto-hub is always charging, whether moving or parked. Electrified paths are easily installed and maintained by humans in the auto-hub, but the tubes are not very accessible for humans. Fully electrified tubes should not be necessary to keep carrier batteries charged.

Carriers K and L have just been loaded by pickers 60, and are on their way to deliver their items. Carriers G, H, I and J are sitting at the charging stations (if the paths are not electrified for charging), for 2 possible reasons: 1. There are too many idle carriers at this time, and they can't all fit on the regular auto-hub path, without interfering with the process. 2. Those four carriers have low batteries, and need charges before going back into service.

Carriers E and F are bringing newly delivered items from the CRU to the auto-hub. However, Carriers A-D are in the way. A-D are empty and idle, just waiting for orders. The pickers 60 are also waiting, so they are sitting at their charging stations.

At this time, the algorithm would direct Carriers A-D to move forward, to let Carriers E and F make their deliveries from the CRU to the auto-hub. This is simple, since the pathway is circular. Carriers A-D can just go back around, in order to get behind E and F. But if there are still more items in the CRU that need delivery to the auto-hub, then carriers A-D can go help (unless plenty of other carriers are already there, being loaded, or waiting). The circular pathway lends flexibility to the system. Even if the auto-hub is nearly full of carriers, and a new carrier comes in with an item from the CRU, all the carriers can get out of the way, just by traveling in the circle to the right point. This is not perfectly ideal, because it wastes a tiny bit of energy, but it's an example of the flexibility that is available if needed.

Notice each picker 60 can serve 2 shelf units, because they are on swivel mounts, and able to rotate to dock with both shelves and also dock with the carriers. Carrier A is in position to receive a box from a picker 60. But if the next order is for an item on a different shelf, then Carrier A will move forward to the correct position to receive the item (in its box) from another picker.

Another reason this example has 4 tubes instead of 8, has to do with depth of the tubes. It may be difficult to fit more tubes in, down at tube level. The tubes are coming in from underground, while the auto-hub in this example is at ground level (auto-hubs can be built partially below ground level, but that can make them more vulnerable to flooding). So in this example, Carriers K and L are going downhill, on their way to the tubes, while Carriers C-J are going uphill to the shelf unit level, and Carriers A and B are at the base of the shelves, which is above ground, above the tubes. Carriers know the product traits and requirements, by their SKUs, so in another embodiment, carriers can "jack-up" (discussed later) if a product should be kept relatively level while going up or down a ramp.

Regarding flooding: as mentioned, long sections of tube can be installed at a very slight slope, with riser pipes at the low end of each section, so if there ever is flooding, the risers can be used to suck out all the water, which would be collected there by gravity. The riser can even extend deeper into the ground to create a reservoir, in case of even greater flooding. Moisture detectors can be installed at the base of each riser, and at other strategic points. Reports of water and its location can be sent immediately (possibly by radio, and/or via passing carriers), and any affected tubes may be off limits to carriers, until the problem is fixed.

Shelf Units

Figure 7:
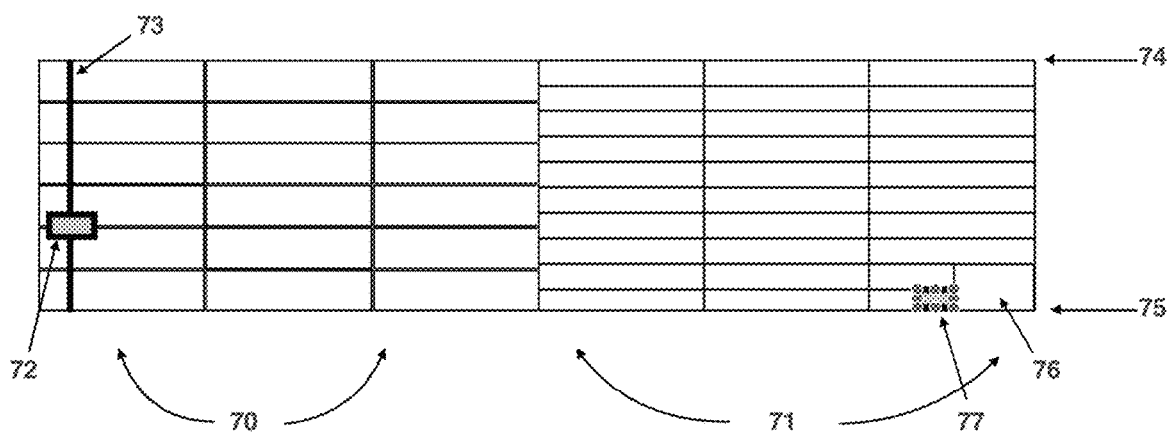
FIG. 7 is side view of a shelf unit in the auto-hub of FIG. 6.

FIG. 7 illustrates a shelf unit in the auto-hub of FIG. 6. The left shelf sections 70 are for large and medium-large boxes. The right shelf sections 71 are for small boxes. Other shelf units may have medium-small boxes, or more large or small boxes or other sizes. In the preferred embodiment, the picker 72 can swivel 360 degrees, on a swivel base, in order to serve 2 shelf units at once. In another embodiment, another picker will be working with the adjacent shelf (across the aisle), but the two adjacent shelf units can still be close together, because the two pickers can be programmed to always take paths that prevent collisions with each other. The picker 72 moves on the picker travel frame, which works like this: The picker 72 is permanently mounted to a carriage that is driven up and down the Y-rail 73 by a motor. The Y-rail is driven by motors along the X-rails 74 and 75, that run along the upper and lower edges of the overall shelf unit, similar to a 3D printer, so the picker 72 can quickly be moved to any precise location on the entire shelf unit to pick or place a box.

When the picker 72 has picked a box from a shelf, it quickly moves into position to transfer the box to a carrier, at Carrier Transfer Station 76, in the lower right section of the shelf unit in this example. There are several ways for the interface to happen: 1. If the picker is not designed to swivel, the carrier pulls into the lower right of the shelf opening, where it is, in effect, presenting itself to the picker as a part of the shelf.

The transfer is made, and the carrier backs into its original pathway (which goes to the tubes) to make its delivery. 2. If the picker is designed to swivel, then the lower-right opening in the shelves is not necessary, because the carriers can stop right on their path to the tubes, at a location where the picker can swivel 90 degrees to make its transfer into its carrier.

Since the Y-rail 73 cannot be allowed to block the picker from accessing the shelves, the carriage must support the picker 72 out to the side of the Y-rail 73. Therefore, in order for the picker 72 to have access to all shelves, the Y-rail 73 must be able to travel several inches past one end of the shelf unit. For space efficiency, that should be the end where the carriers travel (allowing the other end of the shelf unit to extend clear to the other wall). So both X-rails will extend into that space where the carriers travel. In order to not disrupt carrier travel, the lower X-rail 75 can be partly or fully buried in the floor of the carrier path if needed, as long as a slot or ledge is left for the Y-rail 73 link to the lower X-rail 75.

When the picker 72 is going into position to align with a carrier, the Y-rail 73 may collide with the carrier if the system isn't designed correctly. One solution is to have the rotation of the picker 72 to be made with a cam, track or other mechanism, which can swing the picker 72 out past the Y-rail 73 to meet the carrier. This allows the picker 72 to align with the carrier without the Y-rail 73 being out into the carrier path. For the cam to be more effective, and to not run the picker 72 into the Y-rail 73, the cam may need to swing 270 degrees away from the Y-rail 73, instead of 90 degrees toward the Y-rail 73.

Whenever the picker 72 is not busy, it parks at a charging station 7, which is located next to the Carrier Transfer Station 76, since that is where it often finishes a task (transferring to a carrier), or starts a task (receiving a restock item from a carrier). The most popular items on a shelf unit are generally stored closer to the charging station 77 and Carrier Transfer Station 76, than the less popular items. Overall, this shortens the time and distance traveled for picking and placing.

But carriers will do picking and placing too; for example with cartridges and lockers. In prior art, picking and placing has been accomplished in various ways. Some robots automatically dump their contents into a bin or chute. Others have short conveyor belts to move packages off. Neither of these are well suited for LTT tasks, where accuracy is needed, and speed is desired. Furthermore, both dumper and conveyor robots need assistance to get packages on board. They don't pick. They only place-inaccurately. Other robots can pick, using certain EOAT (end of arm tools). One of the most popular EOAT is a set of suction cups or suction pads which bond to a box with vacuum. This requires either a vacuum pump, or an air compressor, hoses and nozzle to create vacuum from pressurized air. In LTT, a carrier fitted with this equipment would be cumbersome, loud, expensive and inefficient. Other robots use adhesive grippers, which can quickly lose stickiness, and require difficult methods of releasing the box or item. Other robots use gripping action, simulating human hands or arms. These are generally slow and expensive, and would not be ideal for LTT carriers. However, one embodiment of this disclosure uses gripping tools for transferring boxes. But the preferred embodiment uses an apparatus and method that are described next.

Carriers

FIGS. 8A-8F illustrate notable details of the Robotic Carrier 80, as it interfaces with a section of Shelf 81, to retrieve the Box 82 (a reusable box) from the Shelf 81. Carrier 80 is similar to a standard fixed path AGV (Automated Guided Vehicle) that has several unique, novel modifications, which are shown in FIGS. 8A-8F. Some standard elements well known to those skilled in the art, are not shown, in order to reduce clutter in these diagrams. The Box 82 has plates 83, made of ferrous material, such as steel, mounted to its front and bottom, to aid in moving and holding the Box 82 in place on the platform 84 (surface) of shelves, carriers, pickers, placers, cartridges, lockers, etc. (all LTT components to which the elements of 8A-8F apply).

At least 1 permanent magnet 86 protrudes up through the platform 84 to engage the bottom plate or plates 83, just at the surface of Platform 84. 2 magnets on each surface are preferred (to minimize accidental rotation of Box 82). On Box 82, the bottom plate or plates 83 (best seen in FIG. 8E) are positioned to contact the magnets when Box 82 is in the correct position. The magnets 86 are mounted to leaf springs 87, which are attached in the middle to the underside of the platform 84, with the leaf springs 87 having cams 85 that protrude up through a hole or slot in the platform 84. If a cam is pushed down (actuated), its attached leaf spring is also depressed, which pulls down its magnet 86, thereby breaking the magnet's contact with the plate 83 on the bottom of the Box 82. The leaf springs' 87 purpose is to solidly hold the magnets 86 in place, protruding up through holes in the carrier floor, where the magnets 86 will contact the steel plates on the bottoms of the boxes, in order to hold the boxes precisely in place during travel. The magnets 86 protrude up through the holes to a position flush or very slightly above the platform 84.

Figure 8A:
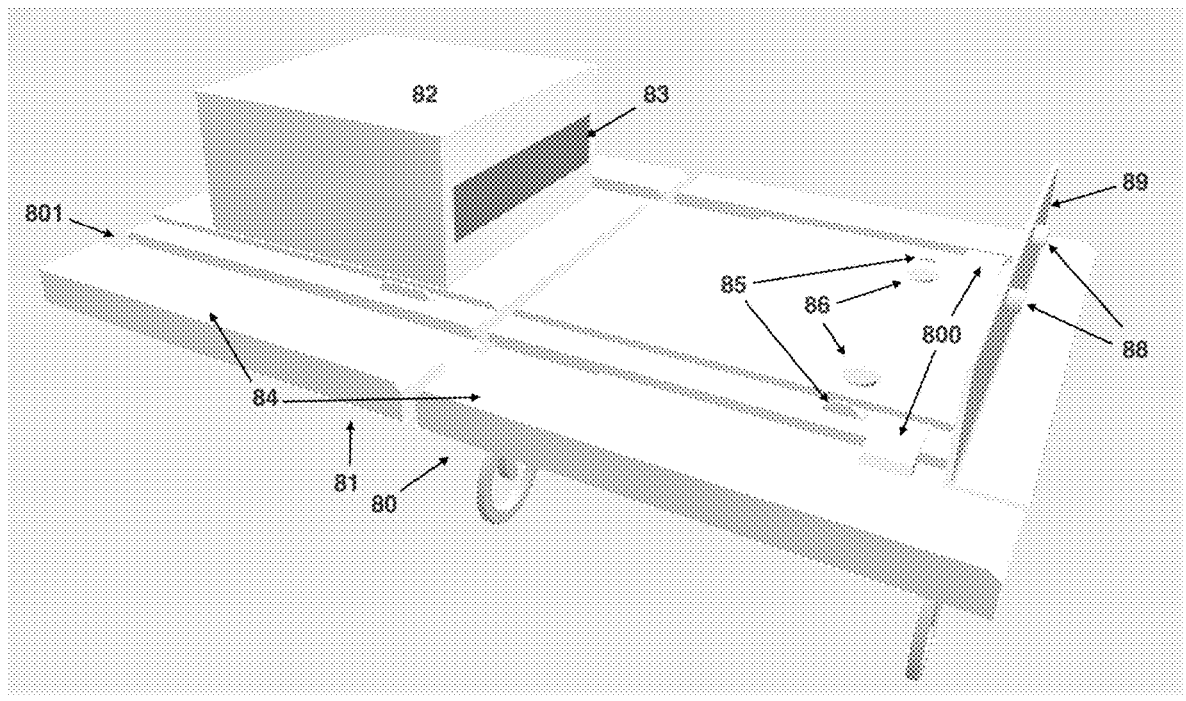
FIG. 8A is a top perspective view of a robotic carrier positioned adjacent to a shelf of the shelf unit of FIG. 7.
Figure 8B:
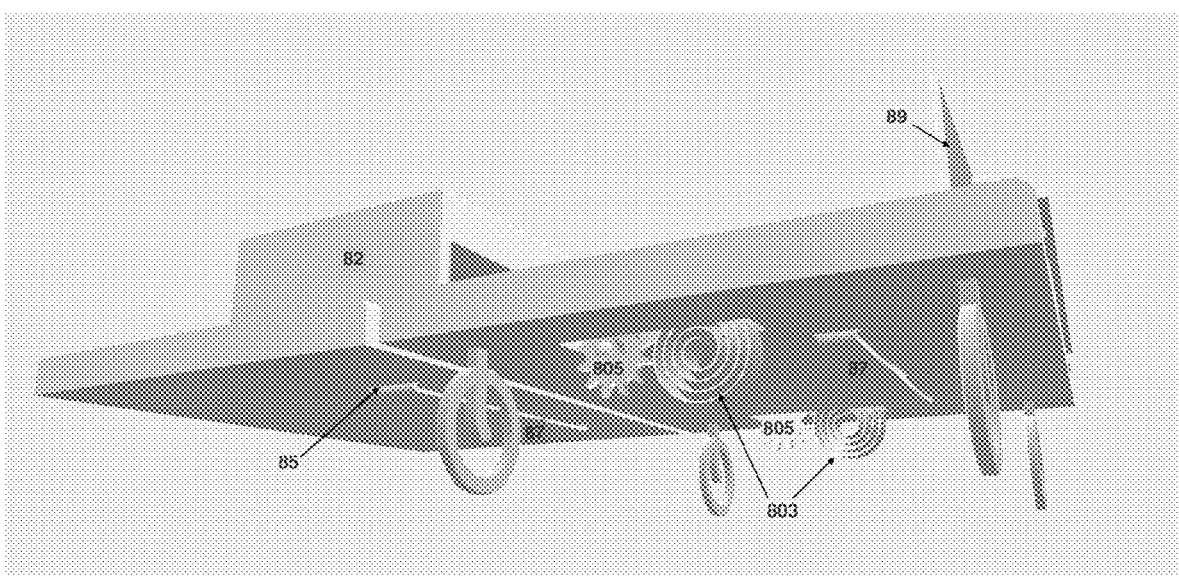
FIG. 8B is a bottom perspective view of the robotic carrier and shelf unit of FIG. 8A.
Figure 8C:
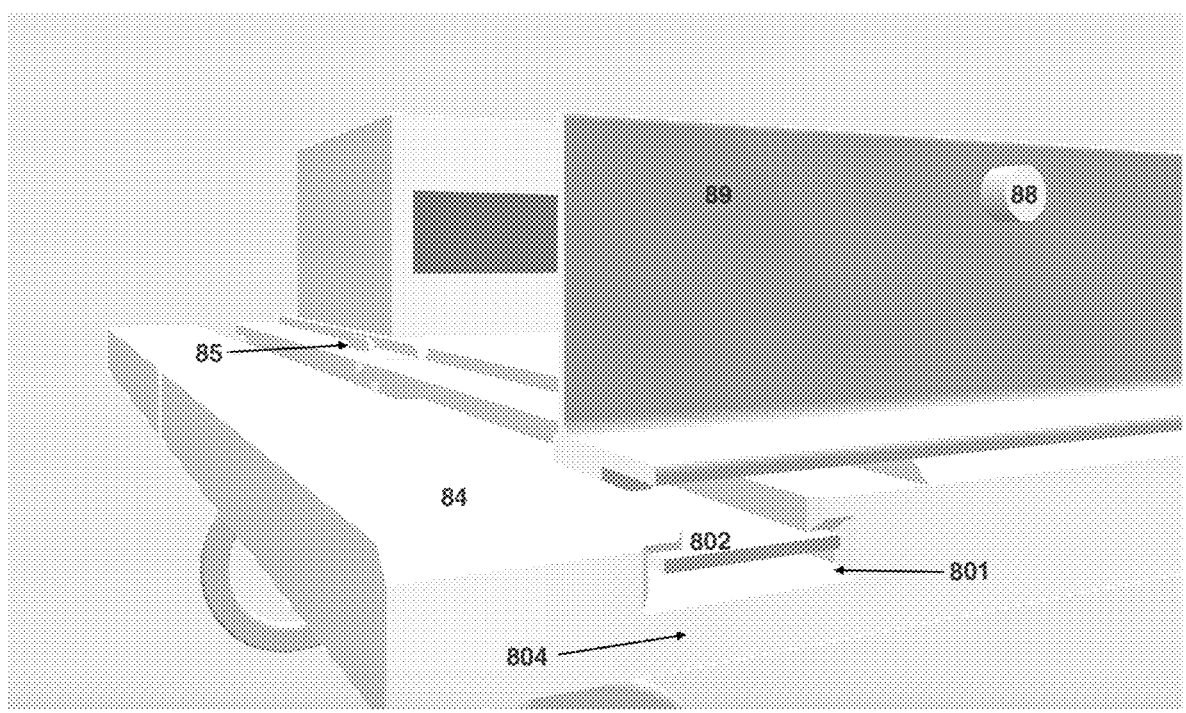
FIG. 8C is a front left-side perspective view of the robotic carrier of FIG. 8A.
Figure 8D:
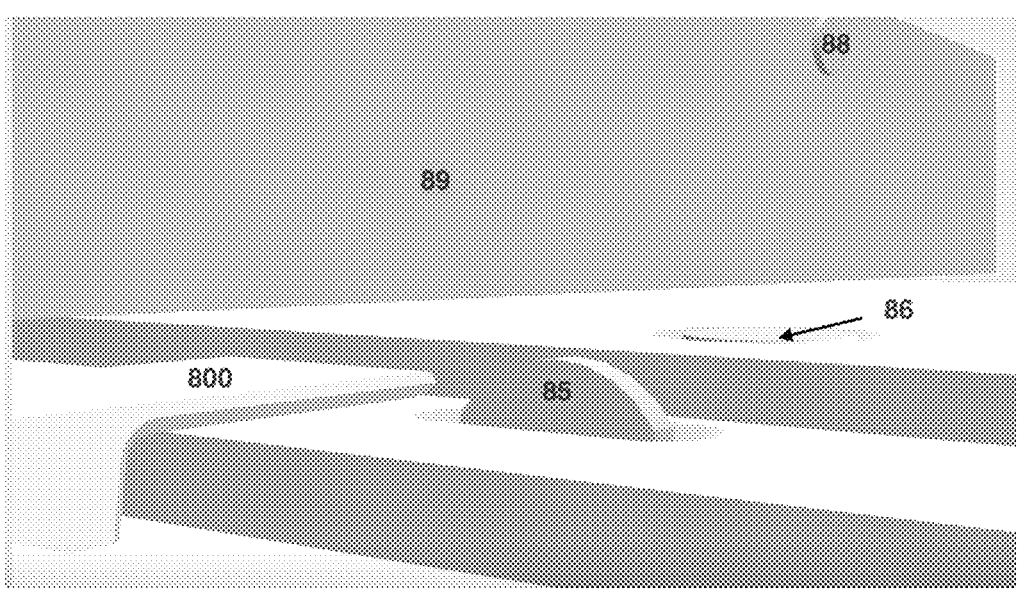
FIG. 8D is an enlarged rear perspective view of a cam and plow robotic carrier of FIG. 8A.

As best seen in FIG. 8C, T-slot 801 in the carriers allows a Carriage 802 to slide within the carrier, and across into the T-slot 801 of Shelf 81. A Cam Actuator 800 (FIG. 8A) is attached to the Carriage 802, such that when the Cam Actuator 800 slides over the cam 85, it depresses cam 85. The cam 85 and Cam Actuator 800 are always below the platform 84 surface, so they do not touch the Box 82.

Also attached to Carriage 802, is Plow 89, which can push a Box 82 off of the Carrier 80, and onto the Shelf 81. But in FIG. 8A, Plow 89 is ready to retrieve Box 82. The Carriage 802 moves forward through the T-slot 801, driven by a Push/Pull Tape 803, shown underneath the platform 84 in FIG. 8B. The Tape 803 is attached to Carriage 802 preferably near the front of Carriage 802, and is perforated (perforations not shown), such that it can be propelled forward and back by a drive mechanism, such as a threaded or screw drive, or gear 805, which is driven by a motor that is powered from the carrier's battery. Tape 803 is stiff, yet flexible enough to be coiled (803) within a housing (not shown). The coil of Tape 803 is attached to a torsion spring (not shown) which aids in rewinding Tape 803.

Both Gears 805 are on the same shaft, driven by the same motor, so both Tapes 803 extend together, simultaneously pushing both Carriages 802 out of the platform 84, and across a very small gap, and into the T-slots 801 of Shelf 81. This moves the attached Plow 89 and also the attached Cam Actuators 800 forward until they reach the cams 85 of the Shelf 81. As the Carriage 802 continues forward, the Cam Actuators 800 depress the cams 85 of Shelf 81, thereby depressing and detaching the magnets 86 from the bottom plate 83 of Box 82. Next the plow contacts the front plate 83 of Box 82 with its electromagnets 88, which are activated to magnetically bond to the Box 82. Then the motor reverses the Gears G, pulling back the Carriage 802, the Plow 89, and the Box 82. As the carriages continue back, their Actuators A move away from the 2 cams 85 of Shelf 81, allowing the magnets 86 to raise again. However, at that point, the bottom plate 83 of Box 82 has moved away, and does not contact the magnets 86.

Since the leaf spring also has some lateral flexibility, the magnet may initially break its contact at one edge, but remain in contact at the other edge. But as the tape continues to push forward, the entire magnet breaks contact with the box plate.

As the Carriage 802 continues back, it pulls the box onto its platform 84, until the Cam Actuators 800 depress the cams 85 of the Carrier 80, lowering the Carrier's magnets 86, allowing the Box 82 to continue onto the Carrier 80 until the Plow 89 trips a limit switch (not shown), which turns off power to electromagnets 88, breaking their magnetic bond to the box plate 83, and leaving the Box 82 at the correct position. The carriage continues to move back until the cams 85 are released, allowing the magnets 86 to raise and contact the plate 83 on the bottom of Box 82, to hold Box 82 in place while it is being transported by Carrier 80.

When Carrier 80 is transferring the Box 82 onto a shelf, cartridge cell, or locker, etc., the process is reversed. Carriage 802 moves forward, depressing the cams 85 and magnets 86. Then the plow meets the front face of the box, and begins pushing it. As the tape continues to push these things forward, the cam activator slides along the cam, keeping it depressed, until the bottom plate 83 is out of reach of the magnets 86. Then the magnets 86 rise, Box 82 moves onto Shelf 81, where its magnets 86 are depressed, allowing Box 82 to move into position. As the Plow moves back, the Magnets rise, and bond with the bottom plate 83 to hold the Box 82 in place.

In some places, there may be no concerns about shelved boxes getting jostled or somehow moved out of position. If that is the case, then there is no need for permanent magnets 86, or leaf springs, or cams in those platforms. In that scenario, when a box is being placed on the shelf, the plow comes to a stop when the box is in position, then the electromagnets turn off, and the plow moves back.

In T-slots that are designed to receive a moving Carriage 802, the entrances are chamfered to mitigate alignment issues. Also the front tip of the carriages are rounded or chamfered. The T-slots can be manufactured as shelf inserts made from extrusion. The shelf cut-outs do not go clear through the shelf, leaving a portion of shelf intact (labeled 804 in FIG. 8C) which aids in preserving strength in the shelf.

In another embodiment, the T-slot extrusion can be part of an assembly designed to modify existing shelves to work with the LTT system. The assembly is a board, grid or frame that contains only the shelf part of the components shown in FIG. 8 (T-slots, cams, magnets and leaf springs). The assembly can simply be placed onto, and attached to an existing shelf, using the shelf for structural support. This allows existing shelves to be converted to LTT shelves.

The electromagnets 88 are powered directly from the battery of the Carrier 80, using a flexible cable, since they will be moved back and forth, riding on the Plow 89. However, in another embodiment, some parts of the LTT system can be designed with deeper shelves, requiring the Plow 89 and electromagnets 88 to travel further. If this distance becomes an issue for the flexible cables, the Plow 89 can have a small battery on board to power the magnet, so that no cables are needed. On the carriers, the plow should be in its parked position the vast majority of the time, during which it can be charging the on-plow electromagnet battery, through contact points connected to the Carrier 80 main battery. The battery can be small, since it is used for such short periods of time. The electromagnets' purpose is to pull the boxes, but may also be useful as an extra measure of control when pushing boxes. If so, the electromagnets on carriers will still only be used a very small part of the time. However, picker electromagnets would likely be used much more, especially in the WAH, and would need bigger on-plow batteries.

In another embodiment, mechanically switched magnets can be used instead of electromagnets. This uses the same principle as a magnetic base, such as the magnetic bases on some dial indicators, lamps, or coolant hoses. In this embodiment, a motor rotates a magnetized core to align it with 2 ferrous halves that are separated by a non-ferrous spacer. This alignment magnetizes the ferrous halves, and they will stay magnetized with no additional power supplied, until the motor rotates the magnet back out of alignment again, which demagnetizes the ferrous halves. In some use cases, like pickers and placers that are used frequently, this can require less power overall, and can be efficient for turning on and off the plow magnets.

Figure 8E:
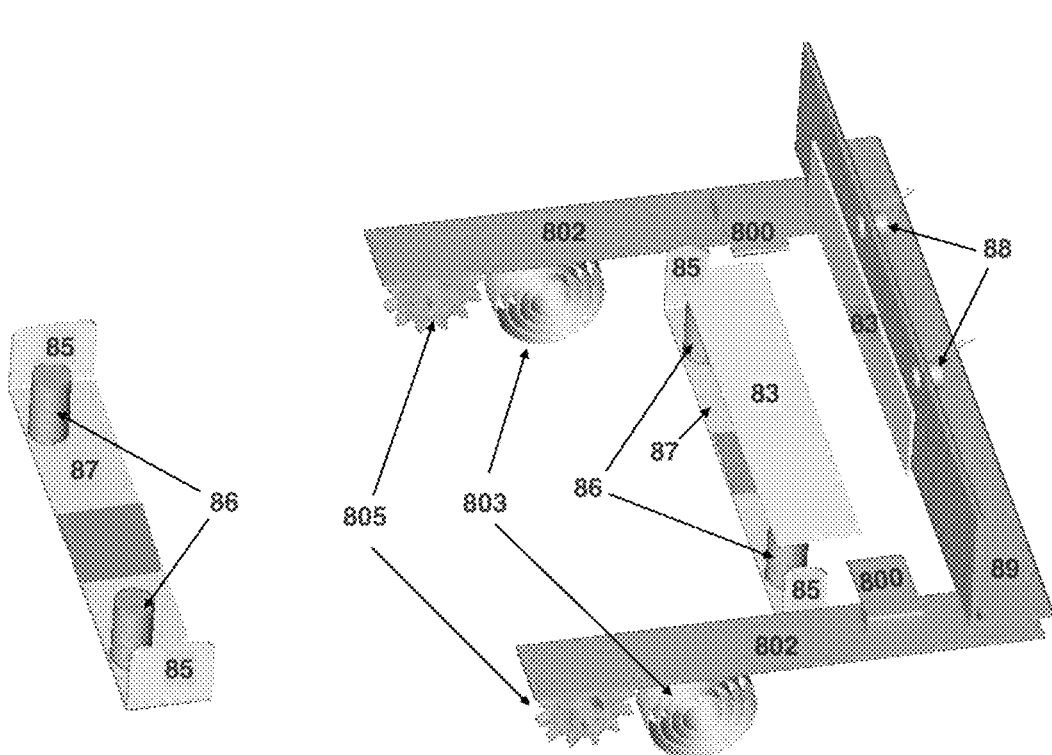
FIG. 8E is an isolated perspective view of selected components of the carrier and shelf of FIG. 8A with the support surfaces removed to illustrate the selected component.
Figure 8F:
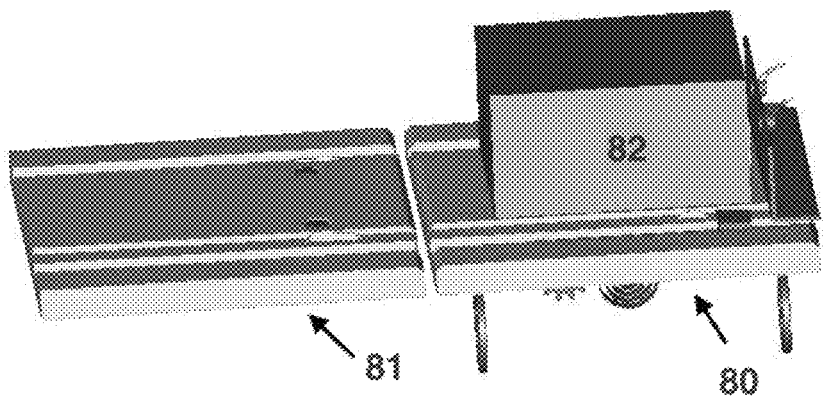
FIG. 8F is a top perspective view of the carrier and shelf of FIG. 8A along with a box configured for movement between the carrier and shelf by the carrier.

FIG. 8F shows the Box 82 sitting in position on the Carrier 80, after the transfer. FIG. 8E is a cut-away view without the section of Shelf F, the body of Carrier 80, or the Box 82 (but does include the box's front and bottom plates 83 in their positions). The plates 83 can be chamfered and mounted on the surfaces of the Box 82 or embedded in the surfaces.

In other embodiments, the leaf springs can be positioned in any of several different directions, such as crossing the T-slot from the opposite direction (and turned 180 degrees). As long as the cam actuator has enough mechanical advantage to break the magnet's contact, these alternate positions and directions can work. The leaf springs and push tapes can be made from any of several different materials or forms, such as metal, for example spring steel; or even wire, plastic, or chain.

Limit switches (not shown) can be mounted in any of several logical locations on the Carrier 80, such as along the T-slot, such that switch trip protrusions placed strategically on the carriage, tape or plow will ensure the correct push tape extension and correct amount of recoil, to ensure that box transfers are reliably quick and accurate.

Figure 9:
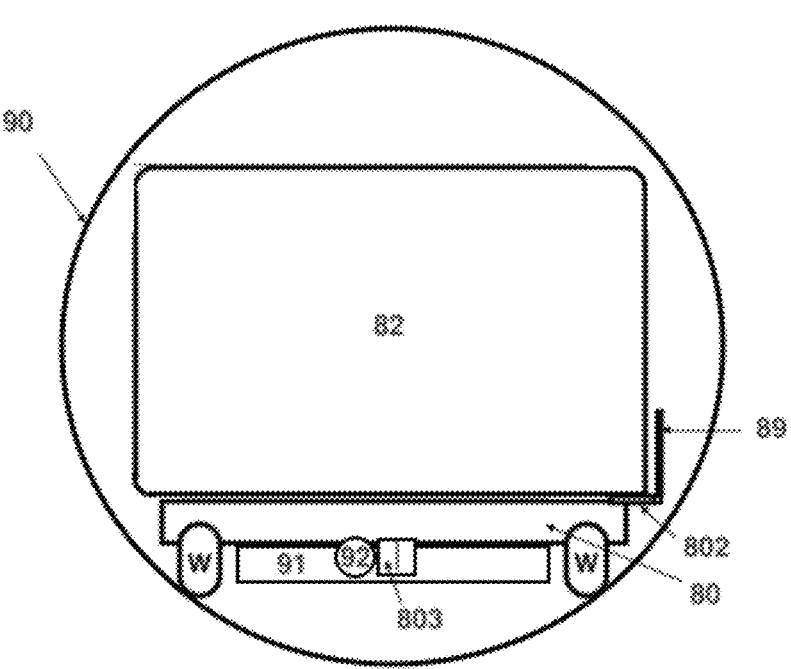
FIG. 9 is a schematic illustrating the carrier of FIG. 8A in a tube with a box.

FIG. 9 illustrates a Carrier 80 carrying Box 82 (which, in FIG. 9, is the largest size box), inside an LTT tube 90. The battery 91 powers the motors, including motor 92 that drives the Push/Pull Tape(s) 803. The carriers can be guided in any of the standard AGV methods (laser, magnetic, strip, spot, inductive wire, optical, etc.), but the preferred embodiment uses simple painted line technology, with lines on the floor or ceilings of the tubes, and floors of the auto-hubs and CRUs. The lines can be applied to the tubes at the factory, and if ceiling lines are used, they can be extremely durable.

There are other embodiments of this transfer part of the disclosure. One uses stronger electromagnets 88 and weaker permanent magnets, such that the pull of the electromagnets overpowers the bond of the permanent magnets. No leaf springs, cams, or actuators are needed. Also, no slots (such as T-slot 801) may be needed, as this transfer system can further be modified for the carriage to skim just over the surface of the Shelf 81, because no cam actuator or wedge (described below) is needed.

In this embodiment, when pushing the box onto magnets 86, the plow motor and drive mechanism are strong enough to slide the box into position, even while the bottom plate 83 is bonding to the magnets 86. Also, the electromagnets are strong enough to pull the box off of the magnets 86. In most shelf situations, only weak magnets may be utilized. But on cartridges riding in delivery vans, the permanent magnets may preferably have more strength, or additional measures of control. Still a balance of power between cartridge magnets 86 and electromagnets 88 can be struck. To do that, one helpful feature is shock absorbers for the permanent magnets in the cartridges (and possibly the carriers or anywhere considered vulnerable to jostling or bumps). The permanent magnets must be properly retained when the box plates are being moved away, but otherwise they don't need to be held rigidly in place. So shock-absorbers can be practical. They can also be as simple as an encasement of squishy foam or gel around the magnet. Also, the inside of each box can have permanent padding to help absorb shock and inhibit shifting.

Wedge Instead of Cam:

In another embodiment, the permanent magnets 86 are solidly mounted in the shelves, carriers and pickers, having no leaf springs or cams; and the carriages have wedges instead of cam actuators, which directly encounter the shelf magnets, which are chamfered around the edge, to receive the wedge. As the wedge drives forward, it raises the box plate 83 away from the magnet 86, breaking the magnetic bond, and freeing the box to move. At this point, the electromagnets contact the box's front plate 83, and magnetically bond with it. The box's bottom plate 83, being separated from magnet 86 by the wedge (which is non-ferrous), can be pulled by the plow across the magnet 86, and continue onto the carrier.

As the wedge forces the box upward, the box also tends to jump slightly back, possibly impairing its alignment with the plow. But the precise shape and size of the wedge and magnet chamfer can reduce this. So can making the wedge from (or coating it with) a low friction material such as Delrin. So can adjusting the speed of the wedge. This design does work, but long term experiments may reveal less than perfect reliability. The preferred solution to this is a lip that projects down from the front edge of the box, positioned to rest against the front edge of the shelf. This prevents the box from moving back from the force of the wedge. The lip doesn't need to be the entire length of the box. It can be, for instance, 1" wide. If so, then a groove is designed into the platform 84 of carriers and pickers, so the box can slide and rest smoothly on the carrier or picker platform 84, while the lip moves freely through the groove. Another solution (in this embodiment) is cushioning or spring loading the electromagnets on the plow, in a position that allows the plow to magnetically bond to the box just before the wedge lifts the box (the spring loading can also allow slight vertical movement of the electromagnets to accommodate the slight raising of the box).

But this wedge embodiment creates another problem: Since the function of the wedge is to separate the plate 83 from the magnet 86, it is harder to drop the box onto the magnets 86 when needed. For example, as the plow pulls the box onto the carrier, and the electromagnets turn off to leave the box in precise position, the wedge still needs to pull back to let the box plate drop onto the permanent magnet. But friction between the box and wedge can pull the box along with the wedge. To prevent this, a bumper is added to the surface of the carrier at a position that retains the box in the correct position, as the wedge is pulled out. The plow is designed slightly higher, so it moves back and forth above the bumper.

But there is another similar problem when delivering the box from the carrier to the shelf. After the electromagnet turns off, and the plow, carriage and wedge begin to retreat, the box can occasionally move with it somewhat, before the wedge frees the box to drop onto the permanent magnets. This can be solved with a simple catch attached to the front lip of the box. Similar to a basic cabinet catch, it provides just the small amount of holding force needed to keep the box in place while the wedge pulls away.

In another embodiment, the cams and cam actuators are replaced by chamfered permanent magnets and/or chamfered steel plates, with the chamfers allowing wedges (attached to the carriage) to force the magnets down and break their bond with the steel plates.

Hooks or catches instead of electromagnets: In another embodiment, hooks (including Velcro hooks) or catches are extended by the carriage to the shelf, and designed to catch on a protrusion, indentation or other physical feature built into or onto the box, in order to pull it. While this negates the need for electromagnets, the plow is still used to push the boxes off of the platform 84. The hooks or catches can be on a semi-flexible stem with cams attached, which are activated as they pass protrusions or indentations along their path of travel, such as in, or adjacent to the T-slot. Alternately, the catches may be activated by motors or solenoids or other drive devices. In all above embodiments, H-slot (or any shape that can retain a carriage while allowing an outer attachment to protrude through the surface) can be used in place of T-slot.

Permanent magnets instead of electromagnets: The electromagnets on the plow can be replaced with permanent magnets that are physically moved by motors or solenoids or other drive devices to activate and deactivate the bond to the box. But another wedge might be needed to help break the magnetic bond, and this option introduces more moving parts, which is generally undesirable. The electromagnets have no moving parts and should be less expensive too.

In another embodiment, the cams and cam actuators are replaced by chamfered permanent magnets and/or chamfered steel plates, with the chamfers allowing wedges (attached to the carriage) to force the magnets down and break their bond with the steel plates.

Other embodiments of this component of the current disclosure include carriers, pickers and other automated units that sweep or plow the box onto and off of the shelf or platform 84; or automated units that connect to the box, bin or other container using one or more of the various types of grippers, (including Scissor, Parallel jaw, Bar linkage (such as a 4-bar linkage), Bellows, Collet, Expanding mandrel, O-ring, Bernoulli, Granular jamming, Adhesive, Pneumatic, Hydraulic, Servo-electric, or Vacuum cup), or one or more of the various types of catches, such as cabinet catches (including Roller, Elbow, Ball, Bullet, Flexible grip, Lever, Spring, Magnetic touch), to move the container onto, or off of a platform 84.

Use of carriers instead of pickers: In the preferred embodiment, there are places in the LTT system where picking items (locating an item on a shelf, and retrieving it) is done by specialized pickers instead of carriers. One of these places is the LTT auto-hubs. However, if an auto-hub is not heavily used, as in an LTT serving a small population of customers, it may be more efficient to use carriers instead, for picking and placing on storage shelves. Pickers will use most of the same components as the carrier described in FIG. 8. But it needs no wheels, and if the shelves are deep, the picker can have longer push tape and additional limit switch positions, in order to place boxes 2 or more deep on the shelves.

Otherwise, there are no major differences between pickers and carriers in the auto-hubs. So if the picking task is infrequent enough, carriers can do the job instead. This requires a simple modification, where the picker head is removed, and a platform is attached to the picker carriage. The carrier drives onto the picker platform, and is carried to the correct location on the bank of shelves, where the carrier uses its plow to pick or place a box. The carrier is taken back down to the on-ramp, where it can drive off the picker platform to its next task. If it has no task, it can wait on the picker platform, or go wait at the closest charging location (which can be the picker platform itself, or the on-ramp right next to the picker platform). If the auto-hub uses deep shelves, the carriers can be refitted with the longer push-tape and extra limit switches.

If an auto-hub is suitable for using modified carriers instead of pickers, but it also stocks some items individually with the vending machine style screws (as discussed below), there are at least 2 options. 1. Store all individual items on one shelf unit, and install one dedicated picker on that unit.

The modified carriers can pick all the other shelves. 2. Make a further modification to the carriers, giving them the PTO (Power Takeoff) needed to drive the vending screws. This is straightforward, as the carriers and pickers have very similar components and design.

Adding front and back walls to the carrier can add strength to its structure, but they are detachable, for flexibility in modifications, as in the case of interfacing with the multi-cell placer head at the WAH, described above. But the front wall can shield the payload (box) from wind, as the carrier travels forward, and the front wall can be aerodynamically designed for that purpose. Also, if the carriers 'maximum speed is 20-30 mph, an aerodynamically designed front can help with energy conservation. If there are scenarios where carriers travel fast in reverse, then back walls can be attached.

Figure 10:
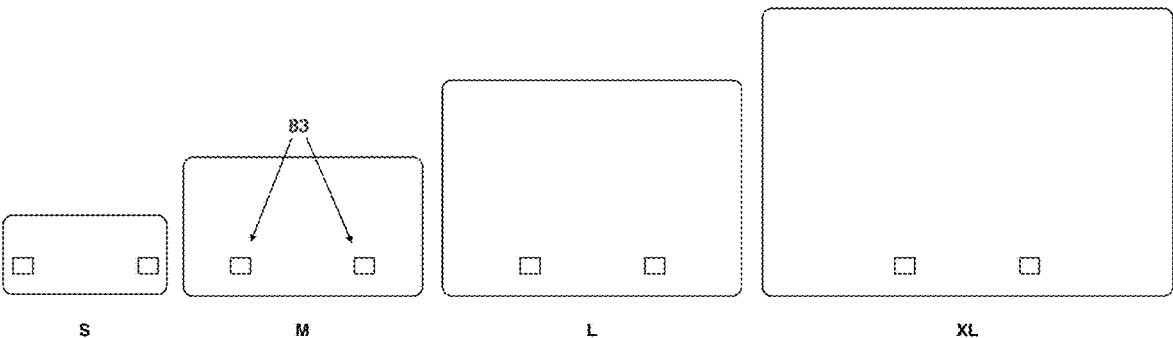
FIG. 10 is a side view of different sized boxes that may be used in association with the LTT.

FIG. 10 illustrates different box sizes used in LTT, with each having the same number, size, shape, configuration and placement of ferrous plates 83 on the front and bottom of the boxes, such that all can be handled, stored and moved properly throughout the LTT system. The system can use 1 or more sizes, but the preferred embodiment uses 4 sizes. The XL size will be as large as possible, without hitting the walls of the underground tubes while riding on a carrier. To allow this, the Carriage 802, Actuator 800, and Plow 89 in FIG. 8 can be located at the edge of the carrier, or even off the edge of the carrier (as shown in FIG. 9); and/or the carrier platform can be extended somewhat along its top edge. Also the Plow 89 of FIG. 8 can be longer to better match the length of an XL box. The other 3 box sizes can be determined mostly by the size-shape spectrum of expected products, each weighted for its popularity.

LTT vending machines: In some LTT auto-hubs, it can be viable to store certain items unboxed. For example, a box of Tic Tacs is only 1.5×2.5". LTT's smallest R-box is much larger than that, so it might make sense to ship many Tic Tac boxes to the auto-hub in one Rbox. At the auto-hub, a special LTT robot can be modified to pick certain types of these individual items from the R-boxes, and place them on specially designed auto-hub shelves. These shelves are similar to vending machine shelves, and have a machine screw advancement system similar to that of standard vending machines. There are picker robots that use EOAT, such as suction cup grippers, which could perform the function of unpacking the individual Tic Tac boxes, and placing them in the LTT vending machines. However, current technology for this can be very expensive, often requires human involvement to train the pickers on the SKUs, and is not 100% reliable. The current disclosure provides 3 solutions to this problem.

In one embodiment, a separate supply box is prepared at the warehouse, whenever a delivery van is going to an LTT that has a vending machine that needs to be restocked. The separate supply box is not delivered in cartridges like the other items, but handled by the van driver. The van docks at the CRU, and while the cartridges are automatically transferring as usual (between the van and the CRU), the driver takes the separate supply box, which contains the vending machine items needed, into the auto-hub. The driver can walk behind the machine to conveniently restock it from the back. If this is done regularly, then perhaps only a few SKUs need be restocked with each trip. (And restocking of any particular item can be deferred, so the driver is restocking only a few SKUs each time, which is more efficient.

Another embodiment does not involve the driver or special boxes. The LTT vending machines are modular, wherein each coil screw unit can be easily and quickly removed by the robotic picker, using the same slot/magnet system as the R-boxes, and taken to a cartridge in the CRU by a carrier, as if it were a standard R-box returning to the warehouse. At the warehouse, the modular coil screw unit is restocked either by humans or the expensive high-tech robots. It is more practical to have expensive picker robots at the warehouse, where they'll get far more use than they would at each LTT, and where humans are there to intervene if they have a problem. The newly restocked modular coil screw unit is sent to whichever LTT needs that SKU next, where it will be swapped for another nearly empty coil screw unit of that SKU.

In another embodiment, the LTT vending machine shelves (with all its coil screws) can be made up entirely of standard LTT cartridges that are fitted with coil screws instead of R-box cells. Whenever stock is running low on several items in an LTT vending cartridge, the entire cartridge is swapped for a full one delivered by the next van. This can work better with smaller cartridges, which are part of the LTT system (discussed below). The most popular vending machine items can be stocked in one small cartridge, with the 2nd-tier items (by popularity) stocked in a 2nd small cartridge, etc. When a particular SKU gains more popularity, it can be automatically switched to the more popular cartridge.

A combination of embodiment 2 and 3 above can be accomplished, whereby cartridges can be swapped, and/or individual coil screw units can be swapped, depending on the situation. This requires very little further design modification to cartridges or coil screw units, since they're already both designed to work with the other components of the LTT system. This combination (of embodiments 2 and 3 above) allows tremendous flexibility in the vending machine portion of LTT. For example, if a social media craze causes skyrocketing sales of orange Tic Tacs, the next vans can deliver several orange Tic Tac coil screw units to each LTT, and swap them with coil screw units of whatever SKUs are least popular at that moment.

Figure 11:
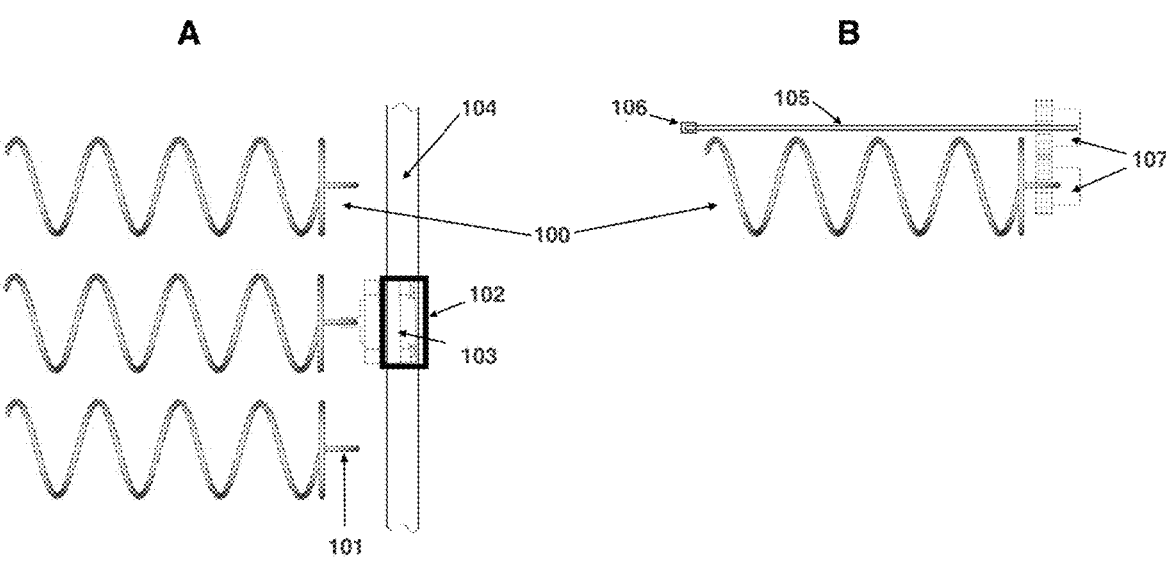
FIG. 11 is an isolated plan view of an alternative embodiment of the carrier of FIG. 8A that incorporates standard vending machine coil screws modified to have drive shafts.

Again, the LTT vending machines have a machine screw advancement system similar to standard vending machines, but not identical. In LTTs, the picker robot links to the screws' drive shafts to turn them. So there is no need to have a separate motor for each SKU, as in standard vending machines. FIG. 11 shows standard vending machine coil screws 100, modified to have drive shafts 101. Different sized coil screws 100 can be used for different products.

When a single box of Tic Tacs is ordered, the picker uses its power takeoff to drive the corresponding coil screw 100, dropping the Tic Tacs into an R-box for delivery. A regular auto-hub picker-bot can be modified for this purpose, or an additional specialized robot can be used. In another embodiment, this system (a Cartesian traveler system that moves a single motor to turn any item-advancement screw) can be employed in any standard vending machine as well, thereby saving the expense of the many motors and wires used in the most common design of vending machine prior art. This embodiment is shown in FIG. 11A, where a standard vending machine is using the LTT vending machine drive apparatus and method: The carriage 102 can quickly move the motor 103 along the Cartesian coordinate travel frame 104, to any of the coil screws 100, containing the item desired, and then move the motor 103 forward to link the motor 103 to drive shaft 101, to drive rotation of the coil screw 100 from the back.

The LTT vending machines, which are not for human interaction, use a variation of this apparatus and method. In LTT vending machines, the link is instead made near the front of the coil screw 100, as shown in FIG. 11B. The picker PTO links directly with shaft 105 (or it's fitting 106, as shown). If you order a box of orange Tic Tacs, the picker takes the smallest size LLT R-box to the orange Tic Tac location, and links its PTO to the shaft 105 that drives the coil screw 100. Since the picker is interfacing with the coil screw 100 from the front, but the coil screw 100 is driven from the back, a gear mechanism 107 is attached, as shown in FIG. 11B. The picker PTO drives the shaft 105, which turns the top gear, and thus the bottom gear, and thus the coil screw 100. The coil screw 100 is turned one revolution, which drops the Tic Tacs into the R-box, to be delivered by a carrier by the usual LTT method.

Some vending machines have electric eyes to confirm that the item actually did drop from the coil screw. In LTT, the electric eyes are mounted on the vending machine picker. In the rare event that an item does not drop, the screw can be turned another rotation (which could result in the customer receiving an extra item). To prepare for a rare case of a serious jam, each picker can be fitted with a camera (and other strategically located cameras are placed around the LTT system too) so that a human can see the situation remotely and then control the picker (or carrier) remotely, and if necessary, re-route the nearest van driver to intervene at the affected LTT.

There is also flexibility between R-box LTT items and LTT vending machine items. For example, if a certain item is normally boxed on an LTT shelf, but then becomes so popular that many of that SKU are being stored at the LTT auto-hubs; it may be more practical to store it in the LTT vending machines instead. This could be more space-efficient if the item is small.

Auto-hub stock: Decisions on what items to stock in each auto-hub, are mostly datadriven. People have favorite items that they order frequently. Their local auto-hub will stock those items because they are ordered frequently. An auto-hub can start with small, high margin items that drug stores and convenience stores carry. Season, location, demographics, and item sizes will matter too. If only smaller items are stocked, auto-hubs could hold 30,000 SKUs or more. So one factor can be: expected revenue (or perhaps margin) per cubic inch of shelf space used by the item's R-box. Another factor can be: expected order quantity per cubic inch (to focus on serving the most customer needs).

Combining regular orders with auto-hub restocking, increases cartridge usage efficiency, as the auto-hub restocking can be accelerated or delayed based on open cells remaining in the next cartridges set for delivery to any particular CRU. After delivery, the van returns empty cartridges (full of empty boxes) to the fulfillment center, available to be reloaded for the next delivery.

Auto-hub restock priority levels: When a customer takes delivery of an order from an auto-hub, there is a new opening in the auto-hub for restocking that item, or SKU. If there are more of that SKU still in stock in that auto-hub, the urgency to restock that SKU is not great. But the precise priority of an item's restocking, depends on the normal full-stock level, how many are currently in stock, and how popular the item is (expected demand in the near future). There is another factor: there are products that can be very important to people in certain situations-things like Children's Tylenol, diarrhea medicines, thermometers, iPhone chargers, bottle openers, reading glasses, etc. Those might get extra "priority points" in the formula for calculating the restocking priority (and whether to stock them at all). The priority rank will be considered in the decision of what items to send in the next delivery to that LTT. If there are already many regular items going in the next van, perhaps no restock items will make the cut. If the next cartridges to deliver have lots of room to spare, then maybe all of the restock items can be shipped on the next van.

LTT can have a serious impact on reducing packaging cost and waste. All items will ship in durable reusable boxes (R-boxes) of various standard sizes, for easier picking and placing by the robots. All R-boxes will be small enough to be carried through the tubes, but there can be several different sizes for at least 2 reasons: 1. To save space in the auto-hubs and cartridges, which can hold more small boxes than large boxes. (It would be wasteful to deliver a small item in a large box). 2. To be able to nest the boxes for efficient storage at the box factory, and in transporting them to warehouses, and in storage at the warehouses. There may also be a variety of situations within the LTTs when box storage or transportation can benefit from nesting.

In one embodiment of the current disclosure, the robots gently transfer items from the boxes into the lockers, and return the boxes directly to an empty cell cartridge. The bar code of any fragile items can communicate a fragility rating to the robots, which can slow down all movements of that item, if desired. So very few items will need any shipment packaging.

Each box can have several helpful features, such as a permanent inner padding, a "permanent spool label", or RFID and NFC tags, for identification by robots, and for quick auto-hub inventory checks. With each use, the tag(s) remain on the box, but are associated with a new order, item and destination address. So, for LTT systems, the boxes can nearly eliminate all spool labels, tape, bubble pack, air pillows, SLAM, cardboard, paper, and all human labor involved in these things.

An advantage of standard design reusable boxes (R-boxes) is in transferring to and from shelves (storage shelves, the picker's internal shelf, the carrier's internal shelf, the cartridges, and the lockers). Cardboard boxes can be bulged-out, dented, ragged and/or saggy, sometimes with tape or tears hanging down, which could catch on things during robotic transfers. The R-box will be hard and rigid, which aids in such transfers; and can have rounded bottom edges too, which can even be coated or laminated with Teflon, delrin, UHMW, or any of several low cost, durable, low-friction protections.

LTT has advantages over a drone system. LTT is more controlled and safe. It works during bad weather, handles high volumes easily, can be faster, more tamper-proof, less disruptive to people, uses less packaging, and it delivers to indoor locations that are well lit, secure, dry and more convenient for customers. But drones do have certain advantages, and there may even be ways to combine the 2 systems in some places.

Drone interface: Considerable investment and R&D has been put into drone delivery technology. There may be applications for viable use of drones working with LTT for very fast delivery of items not stocked in auto-hubs. The CRU can have a drone port extending up to a height that is safe from human interference. However, it can be less intrusive and also safer to locate a shielded drone port on top of a building, with an automated elevator for carriers to retrieve the drone deliveries.

Drone Port and elevator: FIGS. 12A and 12B illustrate the drone port, where LTT (or UTT, as discussed below) can receive deliveries from drones. A drone port can be built on a rooftop, patio, apartment balcony, on top of a CRU, a Local Delivery Portal in a UTT, or other locations. Carriers receive the drone deliveries and take them to their destinations, such as auto-hubs, lockers, apartments, homes, offices, and other destinations.

Figure 12:
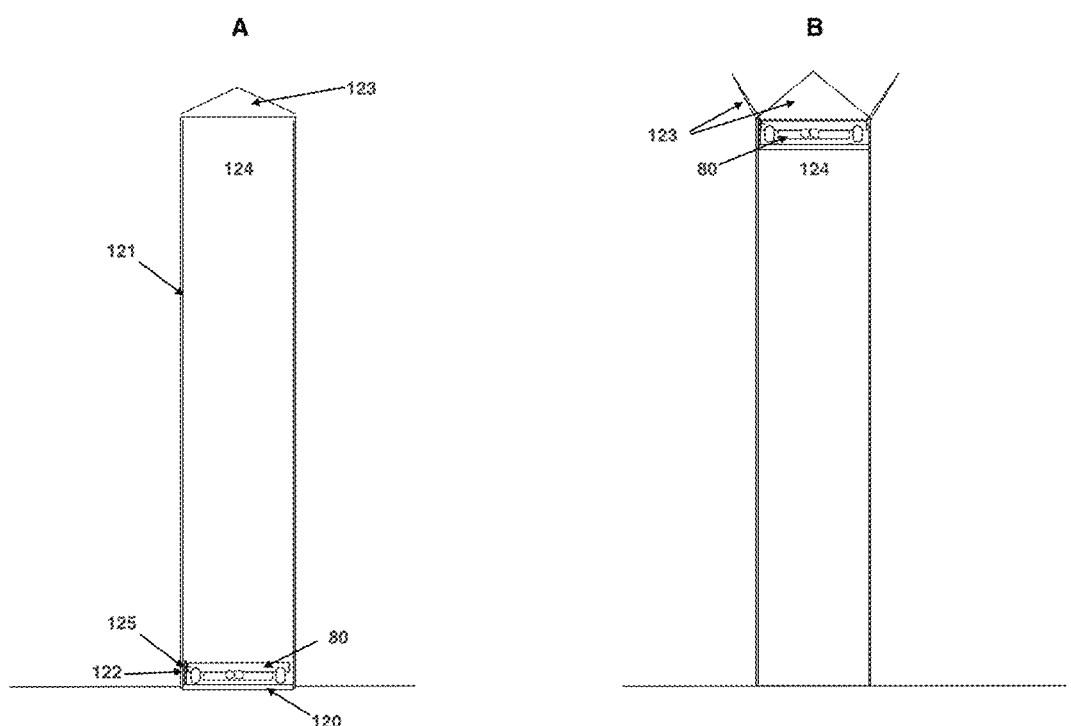
FIG. 12 illustrates an embodiment of a carrier that has driven onto an elevator platform and associated movement between positions "A" and "B"

In FIG. 12, Carrier 80 has driven onto the elevator platform 120 of elevator 121, and linked its PTO, "P" to mechanically power the elevator operation. The carrier can also have contact points 122 to provide electricity to the elevator 120, to power the drone doors 123, and optional security cameras that transmit wirelessly. 124 marks one possible location of a camera, and there may be a camera on each side of the elevator. For higher security, the carrier can arrive at the elevator before the drone even launches, so the camera can confirm earlier that access is secure. Alternately, the carrier may arrive not long before the drone arrives. The construction of the elevator 121 can be another security measure, by building it taller, stronger, smoother and slicker (to discourage climbing) in areas where security is a concern.

As the drone approaches, the carrier's PTO 125 activates the elevator, to raise into receiving position, as shown in FIG. 12B. The weather tight doors 123 are opened (and can be configured to act as a chute for the package, if desired), and the drone places the package directly onto the Carrier 80. The drone exits, the Carrier 80 lowers, the doors 123 close, the Carrier 80 disconnects from the PTO 125 and electrical contacts 122, and the Carrier 80 delivers the package. Error-free delivery can be more certain, if the Carrier 80 brings a large box for receiving the package, but a box may not be necessary with packages and scenarios where the carrier can deliver the package simply by pushing it off with its plow, and can be programmed to travel slower for these special deliveries. Also the cameras, elevator lift 120 and doors 123 can be hardwired, or otherwise powered independent of the Carrier 80.

For customers in all LTT zones, additional delivery time categories can be created for marketing purposes. For example, if the LTT operator is Amazon, the LTT auto-hub items might be classified as "Ultra-Prime" (items delivered in 30 sec-5 minutes), and another level of Prime, perhaps called "Super-Prime", with items delivered in 1-6 hours from order placement. For any order, a customer's Super-Prime options would only include those LTT-eligible items that are already in stock at the closest FC (which could include millions of items). Remember, pre-boxed items can be stored at the FC, ready for restocking the LTT auto-hubs. That idea can be expanded to include items with "2nd-tier popularity". So items that aren't quite viable for the LTT auto-hub, can be pre-boxed and stored at the FC, ready for automated "Super Prime" delivery to any LTT.

To ensure the 1-6 hours, delivery to LTTs can be more regular, by buffering with priority of auto-hub restock orders. However, in big cities with traffic problems, auto-hub restocking may be better at night, when delivery vans can travel easier. So a balance must be struck. For any Super-Prime orders that aren't already pre-boxed at the FC, those orders can be given high priority, such that they always make it onto the next van to that LTT. As Super-Prime becomes more popular, and each FC serves more and more LTTs, its in-house auto-hub can grow to include many more pre-packed items in this highly efficient new chain.

If a new class of deliveries can suddenly be made in 1-6 hr instead of 1 or 2 days, then Amazon marketing can decide if that should be separately branded as "Super-Prime" or not. Of course, any seller could choose similar delivery time categories or branding.

Warehousing and logistics advances like picker robots, warehouse AGVs, AMRs, robotic forklifts, have spawned an entire industry segment of safety for the humans working around these machines. This was also the case with traditional conveyor systems, forklifts, and other equipment. Safety measures are expensive, and often slow down operations, partly from speed limits needed on any equipment that moves near people. LTT has no such issues. There are no humans involved, no injuries, no safety costs, no speed limits, and the costs for lighting, heating and cooling can be minimized.

Vertical Transportation

In various potential applications of LTT, there are situations in which vertical transportation of items is desirable. For example, high rise apartments with delivery to each level or delivery into each individual apartment. For these, a modified climbing carrier with the open box solution, as described above, would not be ideal, as contents of the box could spill out. One solution is be to modify the carriers to have "built-in lids", such that the boxes, which are loaded and unloaded from the side, will slide under a cover built into each carrier. Since the boxes come in multiple standard sizes, different carriers would be needed for different size boxes, unless each carrier has multiple such covers at different levels, which can be pushed open by a box, as it is loaded. So in the case of the largest box: as the box is being loaded, it can push open the lids designed for smaller boxes, and slide just under the upper-most lid. Now the carrier can travel vertically, without spilling the box contents. Another solution is to use boxes with lids either throughout LTT systems, or specifically for applications that use vertical travel. However, neither of these solutions is ideal, since there are items that are better kept upright, with minimal tipping and turning. Also the design of the carriers can be modified to contact opposing sides of the inner tube walls, in order to climb.

The preferred embodiment of this disclosure uses small elevators, with simple spooled cables, ropes, tapes or straps to raise and lower them. Alternately, a closed loop drive (not spooled) system can be used. Like the rest of LTT, the elevator system can use battery power that is always charging when grid power is available (to ensure availability even in power outages). Relative to elevators for humans, the large amount of testing, safety, and regulation is not necessary. So the elevators and their maintenance is inexpensive, and the elevator shafts can be simple and inexpensive. The carrier quickly rises to the floor of the building where the delivery will take place, then returns in the reverse manor. The elevators can be even simpler and less expensive if no power lines are needed. The carrier simply drives onto the elevator platform, and interfaces its PTO and/or electrical contacts to power the elevator.

If this system is used within warehouses, factories, or any application with heavy use, there may be advantages with elevating only the boxed items without the carriers. With the slotted shelf-electromagnet plow system, it is very straightforward to design such elevators. The carrier brings the order to the base of the elevator, then transfers the order to the slotted shelf of the elevator, which raises or lowers the order. Then a carrier on the receiving level retrieves the order, and finishes the delivery.

There may be other uses for robotic carriers within LTT (or the other applications discussed below), that can benefit from elevators. For example, in UTT, the boxes are delivered underground to homes, but then rise to countertop level for customer convenience. These UTT elevators will be much shorter than those in high-rise apartments, and will generally be used far less. So expense is a consideration, and it is cheaper to not have motors, or run power to each home delivery portal. Instead, the UTT elevators at the home delivery destinations can be powered directly by the carriers. The elevator platform has a drive shaft that is accessed by the carrier through its onboard PTO (power take off) similar to that of a farm tractor. The drive shaft spools or drives the cables, ropes, tapes or straps to raise and lower the elevator's rack, on which the carrier sits. Through latching mechanisms similar to those discussed around FIGS. 14 and 15, the elevator also locks, unlocks, opens and closes access doors to and from the delivery box (for the safety of the carriers and the customers). The same carrier elevator system can be used at the UTT delivery portal, although the preferred embodiment raises and lowers the entire cartridge to the main underground level of the carriers, and the carriers steer themselves to access each cartridge cell on one level, until that level is complete, then the cartridge lowers or raises to the next level that needs to be delivered. The idea of powering elevators via carrier PTO can be applied throughout the LTT system.

Tube Path Design

Within any LTT, the tube path layout options would seem endless, but there are ways to quickly eliminate all but the best options. For example, in a large apartment complex, one good design element is to have several exits from the auto hub going out in one-way loops to make deliveries. One-way travel can result in some wasted carrier travel distance, but it's a simple way to minimize congestion.

With the auto-hub positioned somewhere near the middle of the complex, each loop can cover all the buildings in one roughly pie-shaped area out from the central hub. As the tube passes each building, a wye branches off to the building. The wye can be slightly rotated to start the branch rising toward the surface as it enters the building. Once inside the building, a tube may not be necessary, because ideally, the tube enters the building right behind the lockers in a small area inaccessible to the public. If so, a tube isn't needed inside the building. Instead, the carriers just exit the tubes into protected pathways (for example, behind a wall with a locked door, for maintenance access). When the carrier has finished its delivery, it reverses direction, going back down into the underground tube it came from. Once it has passed through the wye and into the main line, it stops, and reverses direction again, to continue forward through the one-way loop, and back to the auto-hub. When a carrier is backing out of a branch after a delivering to a locker, other carriers may need to stop to avoid collision, so communication between carriers will be important. But when a carrier is backing out, it has already emptied its product, so it can accelerate quickly (with no product to harm), to minimized bottlenecks. Communication between carriers can be via radio signals.

Also, if a carrier has not traveled far to make its delivery (because the destination building happens to be near the auto-hub), then it could be more efficient to travel in reverse, clear back to the auto-hub. And if no other orders are being filled behind that carrier, then the path may be clear to go directly back, instead of forward all the way around the entire loop. Again, the system receives inputs of active carriers' positions, speeds and headings, and decides which carrier travel defaults to override. Similarly, a carrier whose delivery destination is near the end of a 1-way loop, may be able to reach its destination quicker by going directly to it, traveling the wrong way through the 1-way loop for that short distance. Again, the software determines if current traffic patterns are such that this can be done, without creating excess congestion. So the 1-way travel is the default, with possibilities for exceptions, whenever the exceptions make sense.

In many of the largest US apartment complexes, the farthest distance a carrier would travel to make a delivery is around 0.5 mile, which would take 60 seconds at 30 mph. If carriers slow down for turns, and traffic, the more distant deliveries might take around 2 minutes. When a customer is shopping online for an item, it is straightforward for the LTT system to calculate and display the delivery time very precisely, using current inventory, current traffic, and the known distances. It should be possible in many cases to project delivery times to within a few seconds, as the customer is placing the order.

For applications where delivery is made directly to apartments, each building could also employ a small version of the loop system. But traffic within each building will be relatively light, so those loops may be unnecessary.

Figure 13:
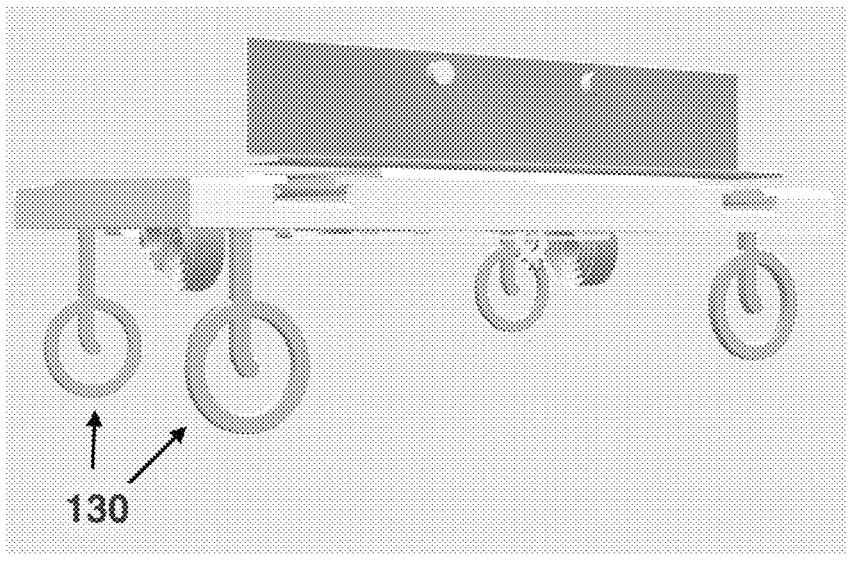
FIG. 13 is a side perspective view illustrating a carrier with rear wheels lowered to keep the platform level while traveling up a ramp.

For applications using lockers, each building could have as few as 2 or 3 lockers, instead of today's typical large banks of lockers, since items can be stored in the auto-hub until customers are ready to receive them. With only a few lockers, the lockers can all be at a convenient height (counter-top level, for example), and in a horizontal row instead of the typical grid, thus allowing easier delivery by the carriers. Carriers traveling from the underground tubes to lockers at counter-top level can use elevators, as described above, or they can drive up ramps. Ramps that are long could require a lot of space within the buildings. Ramps that are short will be steep, and could cause unwanted shifting of the items being delivered. This can be offset by the carriers automatically "jacking-up", as they travel up the ramps, to keep the payload level. This version of the carrier has a mechanism to raise up its rear end well above the normal level, just as it is entering a ramp. This can be accomplished by a lift mechanism, such as a scissor lift, screw lift or telescoping legs. Returning carriers will not need to "jack-up", since they are only carrying empty boxes. FIG. 13 illustrates a carrier with rear wheels A lowered to keep the platform level while traveling up a ramp.

Retrofitting apartments, hotels or other buildings for direct delivery is obviously be more difficult than installing them in new construction. For retrofits, the tubes can be run along the upper corner of each hallway, and into a locked receptacle by the door of each apartment (still in the upper corner of the hallway). The carrier transfers into that receptacle, which can have a chute or a dumbwaiter down to countertop level, where the customer can retrieve it conveniently.

LTT upload stations within businesses: There are many places where clusters of retail businesses are located near clusters of hotels, apartments, condominiums, or sub-divisions, where there is opportunity for LTT to connect customers to sellers. Often these retail businesses are lined up facing a street, with delivery truck access in back, where LTT tubes can be installed. A business simply puts an order into the right-size standard reusable LTT box and inserts it into an "upload center" to quickly send orders anywhere throughout the LTT system.

As more LTTs are built in the area served by a particular warehouse, demand on the auto-hub will grow, both for auto-hub restock items, and 2nd-tier LTT items (worth pre-boxing and storing at the WAH, but not at each LTT). Average warehouse size is huge, and a typical WAH will be relatively tiny at first, so there will be plenty of room to grow the size of the WAH, as the demand on it grows. The more it grows, the more items can make the cut to become pre-boxed for 2nd tier.

Flexible Inventory and LTT Expansion

When a new LTT is being built near an existing LTT, there can be advantages to connecting them, wherever that is possible. LTT has built-in inventory flexibility and buffering. And the more an LTT expands in one particular area, the more flexibility and buffering it can have. Even within a single LTT, there is some flexibility, because items can be sitting in the CRU, the auto-hub, or in any of the carriers, and still be available to any other part of that LTT. In some cases, even the lockers and the empty cartridges waiting to be returned to the warehouse, can be used as inventory buffers.

For example, if the warehouse auto-hub is preparing cartridge #7A for morning delivery to LTT #3, but the cartridge will have 4 cells left open, then why not fill those cells with 4 items known to be most popular at LTT #3's auto-hub? But what if the auto-hub at LTT #3 is completely full, and cannot accept these 4 items? No problem. We have data on LTT #3, and it shows there is over 99% chance that at least 4 items will be ordered from LTT #3's auto-hub (via UltraPrime) before noon, which is the estimated time for the noon delivery van to pick up the empty cartridge #7A from LTT #3 (right after it delivers a load of regular orders to that CRU).

So the extra 4 cells are filled with the 4 popular Ultra-Prime items, and cartridge #7A is delivered to the CRU at LTT #3 in the morning. Then the carriers at LTT #3 deliver the regular orders from cartridge #7A to the lockers at the various buildings, and when they're finished, the 4 auto-hub items may still be there in cartridge #7A. Whenever the next auto-hub item is ordered at LTT #3, that order is quickly delivered, creating a new opening at the LTT #3 auto-hub. Now one of the items remaining in cartridge #7A (which is still sitting at the CRU) is removed, taken to the auto-hub, and placed into inventory there. The other 3 items remaining in the CRU will be transferred likewise, as more auto-hub orders come in, and each order creates another space in the auto-hub.

But what about the rare case that these items are still in cartridge #7A, when the delivery van arrives at noon? In that unlikely event, those items can simply be stored in carriers while those carriers sit in a battery charging bay, or in line for its next task, until more space opens at the auto-hub, thereby emptying cartridge #7A to be returned to the warehouse. What if all carriers are either busy making deliveries, or charging while also containing an item, so there are no more places to store the last items still remaining in cartridge #7A? Simple. They stay in cartridge #7A, which goes back to the warehouse as scheduled, where those items will go back on a shelf at the warehouse auto-hub, unless the warehouse auto-hub software decides to leave it in cartridge #7A to be delivered yet again. This is just an example, to illustrate the desired points, showing some ways to buffer storage. Actually, the auto-hubs have an additional purpose, serving as a locker buffer for its LTT, and so will have plenty of available space, when cartridge #7A is first being loaded in the morning. And there is no reason to keep inventory so close to 100% anyway.

Lockers and Locker Buffer Function of LTT Auto-Hubs

It is easier, cheaper and more efficient for carriers to transfer into locker cells that are in a horizontal row, since the carriers can simply drive to a spot behind a certain locker, and make the transfer, without having to somehow go up or down to another row of locker cells. And if the row of locker cells are at a suitable height, it will be more convenient for customers, than the current Amazon locker design, which ranges from zero to 7 feet high.

Even if an LTT had a large auto-hub with 100,000 SKUs, most items delivered by that LTT would likely be non-auto-hub items, coming from a warehouse, because warehouses have many more SKUs (possibly millions). So if LTTs are as popular as expected, how can just 3 or 4 or 5 or 6 locker cells be enough for all the orders? Simple: delivery is so quick, that the lockers remain empty until you're ready to take delivery. You tap the app, and the delivery is quickly made before you even get to the locker. Currently, Amazon allows 3 days for customer pick-up from lockers; but even if it was only a 1 hour maximum, it would need more locker cells than LTT needs, because LTT pick-ups should average between a few seconds and a few minutes.

So how can "even the lockers be thought of as inventory buffers"? Over time, each customers 'patterns of item retrieval from lockers will become known and predictable. At apartment LTT, there can be lockers in all the various buildings, perhaps with 5 cells each. The procedure for a certain LTT might be to deliver only when the consumer signals they're ready to pick up. Let's say the auto-hub is 50 shelf spaces short for some reason (maybe all shelves are full, but a van is arriving soon with 50 extra items that need to be stored). No problem. The system considers all the non-auto-hub orders that are on their way in the van, plus those already waiting on the auto-hub shelves (already ordered, but waiting for customers to signal they're ready for delivery), then it considers the pick-up patterns of the people who ordered those things, and finds all the people that are most likely to pick up an order soon, and it selects 1 of those people at 50 of the buildings in the complex, and then it sends those orders to the correct lockers preemptively. In each of those 50 buildings, there are now 4 empty locker cells, and 1 cell with an order that is waiting for someone who may, or may not retrieve it soon (but probably will, based on observed history). So, in effect, 50 items have been transferred from auto-hub stock to locker stock, using lockers as inventory buffers.

Another built-in inventory buffer: Occasionally an auto-hub will contain non-auto-hub orders that have been waiting for retrieval by the customer for some time (a "long-waiting item"). In today's Amazon lockers, items wait 3 days before returning to the FC, and the customer is refunded. But with LTT, there is inventory flexibility that allows more relaxed policies, if desired, since the auto-hub can hold so much more than today's Amazon lockers. So your local auto-hub may be able to hold "long-waiting items" for 5 days, 10 days or more without straining inventory space. If auto-hub space is needed for other items, long-waiting items can automatically be sent back to the warehouse in the next empty cartridge. And since the warehouse auto-hub is much larger than the LTT auto-hubs, the long-waiting items may be stored there for an additional amount of time, if desired, before they are finally designated "abandoned".

Also, warehouse auto-hub restocking can be done whenever workers are available. If there is a crush of auto-hub orders, the warehouse auto-hub can automatically handle it and then warehouse auto-hub restocking can be done whenever it is convenient.

Connecting LTTs

The first LTTs will likely be "low hanging fruit" locations, where payback period is expected to be shortest. But another consideration should be whether future LTT's are viable nearby, and if it is feasible to connect them to the first LTT. If one LTT is operating and successful in a city or area, then other nearby practical applications (hotel clusters, dorms, offices, various dense housing areas, etc.) may also be viable LTT applications. If the 2nd LTT is built close enough to the 1st LTT, they may be connected to each other, which can produce several inventory synergies:

Inventory sharing for stock-outs: If someone orders all the KitKat bars from one auto-hub, some KitKats can be automatically sent from the auto-hub at a neighboring connected LTT.

Inventory sharing for more options: Let's say each of the 2 connected LTTs' auto-hubs is set up to hold 10,000 SKUs. And let's say the 10,000th most popular SKU is a small item that will ship in the smallest box, and so 8 of them will fit on an auto-hub shelf (8-deep at its particular shelf location). But again, it's the least popular item in the auto-hub, so we don't really need 8 of them in stock, so there is some wasted shelf space. However, when we link to a 2nd LTT, those 8 items can now be shared with that 2nd LTT, so that SKU doesn't need to be stocked at both LTTs.

So overall, you might choose to stock all of the 5,000 most popular items at each of the 2 auto-hubs, but the other 5000 shelf spots at each auto-hub are for items that aren't quite as popular, and can be shared between the 2 LTTs. This could effectively increase the inventory from 10,000 to 15,000 or more at each auto-hub. Likewise, multiple auto-hubs can be linked, further increasing the inventory available to each one. Of course, orders traveling from a neighboring LTT will take a little longer to arrive, but the precise time should be easy to automatically calculate, and those times may be displayed beside the items, even as the consumer shops. The time display could become more important, if many LTTs are connected with some items traveling a few miles, which may take 10 minutes or more. At some certain distance, it can no longer meet the delivery standard, if it's traveling too far, and takes too much time.

Cartridge efficiency: Let's say a delivery van can hold 4 cartridges, and its next delivery is going to two LTTs that are connected to each other. The items destined for LTT #1 would fill 1.7 cartridges, while the items destined for LTT #2 would fill 2.2 cartridges. That will take 5 cartridges total, with one of them 30% empty, and another 80% empty. And the van only holds 4 cartridges, so these 5 cartridges won't all fit. It could be more efficient to send some of the LTT #2 items (the few leftover items in that 3rd cartridge that would be 80% empty) to LTT #1, and then let the LTT carriers automatically deliver them from the CRU at LTT #1, clear over to LTT #2. That way, only 4 cartridges are needed, and all 4 cartridges will fit in the van.

Carrier efficiency gains: At each LTT, a certain number of package carriers are needed. The number depends partly on expected order frequency at peak times, and the delivery time standards we set. If carriers can be shared between LTTs, the objectives can be met with fewer carriers overall. For example, when a delivery van is on its way to one LTT, the carriers from a neighboring LTT can go over to help unload the cartridges. Timing of van deliveries can be made to capitalize on this. For example, if one van delivers it's cartridges to the first LTT around the time that carriers are just finishing deliveries from a neighboring LTT, and are therefore becoming available for more work, those carriers can travel to the first LTT, to help out.

Neighborhood patterns: There are many possible reasons that nearby LTTs could have widely varying order patterns. For example, a retirement community may have lots of early morning orders, while dorms at a nearby college campus may have more late night orders. Again, migration of carriers between LTTs can help.

Specialized robot efficiency: There may be specialized robots for doing specific tasks, such as retrieving items that were never picked up from a locker, or retrieving a foreign object that has somehow gotten into a tube, or a carrier-wrecker to tow a defective carrier home for repairs, or a bump/jostling detector (discussed later). These tasks should be rare, so a specialized robot would sit unused most of the time if it were serving a single LTT. However, if several LTTs were connected to each other, only one of each specialty robot may be needed to serve them all. Alternately, a delivery van can bring specialty robots to LTTs on an as-needed basis.

One specialty robot is a bump/jostling detector that checks for problems within the tubes that are developing from the growth of tree roots, or heaving from freeze/thaw cycles, or some other cause. The location and severity of the bumps can be detected and reported to the AI, which determines a course of action. Actions may be very mild, such as scheduling a series of continued monitoring in the future, to a full shutdown of that area of the LTT with emergency alerts to human LTT monitors. Another action may be to make all carriers to slow down when encountering this area, in order to minimize jostling of their contents.

Also "Shelf lids" can be used to keep box lids shut (if there are any box lids). But for most LTT applications there will be no need for lids on the R-boxes. The boxes will not be exposed to weather or human handling, and will always be secured from too much jostling by the programmed movements of the pickers and carriers. Having no lids makes loading and unloading them easier too. However, each box can be manufactured with slots for adding a lid, which may be desirable if the boxes are used outside of LTT or in unique LTT applications. The "shelf lids" built into the cartridge are made by simply positioning the shelf above each box in close proximity to keep the box lid from opening. The same purpose can be served for boxes with no lids, such that each box in the cartridge has a shelf right above it, serving as its lid.

If small boxes are being transported in a large-box slot in a cartridge, the built-in "shelf lids" of the cartridge will be too high to act as a lid for the small box, which could present some risk of excess jostling. There are several potential solutions for this. Possibly the best solution is careful selection of small boxes with contents most immune to jostling. For example, as the item is weighed and sized when originally introduced to the LTT system, it also gets a fragility rating and an anti-jostling rating. A box of nails would have very low fragility and very high anti-jostling, since it lays flat, and is heavy with a low center of gravity. The LTT software associates those ratings with the box of nails SKU, and would select that box for placement in the oversized cartridge cell with the "shelf lid" that is too high.

A carrier can remove the box contents into a locker in any of several different ways.

1. The simplest solution is to leave it in the box, and let the customer remove it. This requires a degree of customer compliance, but if done right, it could be close to fool-proof. Carriers deliver the box to the locker in just the same way as the cartridge or auto-hub shelf, using the push tape to slide the box into position, where a permanent magnet will hold it. Instructions for users will be very prominent, such as: "Do not move this box! Just remove your items, and leave the box undisturbed. Thanks!". The magnets will be holding the box in place solidly, which should be another good physical reminder to customers who might try to move the box. There are at least 2 magnet holding the box, to keep it from turning or spinning on the first magnet, if bumped or jostled.

Also, an outline of each size box can be drawn on the locker shelf, showing exactly where the box should be located, so that any customer who may accidentally move a box, can see right where to put it back. As an additional visual indication, the outlines can be color coded to match the color of the box, or to match color stripes printed on the box, or other indicators printed on or molded into the box. The empty box waits until another order is being delivered to that location. The carrier first delivers to a locker cell adjacent to the empty box, then retrieves the empty box, and returns it.

2. Another solution is a mechanism to dump and/or push out the contents into the locker. And if the boxes have no lids, this process can be simpler. Most items in drug stores and convenience stores will not be harmed by a small slide or drop from the R-box into the locker. One way to propel the dump action is: first, build the carrier track above the level of the lockers, then push the R-box out of the carrier and off a "cliff", dumping the contents into the locker. The "cliff" would actually be a ramp or rail system designed to smooth the dumping action and keep the box controlled and on track. The electromagnets on the pusher can be rounded, to allow a hinging action with the steel plate it is in contact with, so the bond is not broken as the box tips. Again, this works better if the boxes have no lids.

3. Another solution is a mechanism to push out the contents from the box. Again, this assumes boxes have no lids. As the box sits in the carrier facing the locker, the box wall closest to the locker will be hinged at the bottom, and held shut at the top by medium-weak magnets in the top part of the walls. No other walls are hinged. A similar push mechanism pushes open the hinged wall, and the open wall becomes a shallow ramp down into the locker, and another pusher plows the item out of the box, down the ramp and into the locker.

If someone orders 2 or 3 or even 10 items, do they have to get the 10 orders from separate lockers, 10 times? Generally no. If the items are not ordered from the auto-hub, then the multiple items will be packed at the warehouse into the smallest LTT R-box that will hold all the items (or multiple R-boxes, if necessary), which will be sent in the next cartridge to that LTT. Since most items are small, it is likely that many or all of the items will fit in a single LTT Rbox. If they won't all fit in a few LTT boxes, then some or all of the order will ship by traditional means.

If the order is from the auto-hub, then there are 6 answers to this question:

If all or most of the items ordered are in the vending machine portion of the auto-hub, the solution is easier. A picker collects the items in the right size R-box(es), and carrier(s) deliver it.

Eventually current mechanical picker technology will improve enough and be cheap enough that LTT auto-hubs can automatically combine your entire order into 1 or a few boxes for delivery.

But for now, it depends on whether the LTT uses the dumping carrier design. If so, your order may be delivered in 10 boxes, by 10 carriers, with all 10 dumped into one or more lockers cells. This may not maximize efficiency, but still uses less energy, time and cost than a delivery van.

If the LTT does not use dumping carriers, orders are capped by the number of cells in your closest locker. For example, 4 or 5 items are delivered to the 4 or 5 cells of your locker, with 1 item in each cell, delivered at the same time by 4 or 5 carriers. You can retrieve those items from the cells, then order more if you want.

Another embodiment has one dumping carrier at each LTT just for the purpose of combining an order of multiple items, If the items are small enough to fit into one of the larger LTT boxes, the dumping carrier takes each item up a ramp to the combination station (within the auto-hub), and dumps them down into a large LTT box that is gently jostled to settle the items. Until this combining process is perfected, the auto-hub has cameras, so that remote humans can check that the items have transferred properly.

A combination of answers. An order for 30 items may fit into 5 large R-boxes. If so, the 30 items are put in the 5 R-boxes at the combination station (described above), then delivered simultaneously to the 5 lockers at the destination.

Rating the Viability of An Item for Auto-Hubs

A new item being considered for the auto-hub must first pass the simple qualifiers: It has to fit in the tubes. It can't be vulnerable to the magnets or electromagnets used in moving the R-boxes around (like some gift cards, credit cards or some watches). It can't be perishable (at least not until this issue is specifically addressed), as well as the usual restrictions on poisons, illegals items, etc.

Beyond that, there are several measures that can contribute to an item's viability for an auto-hub:

Highest rankings should probably go to the most popular items in that particular LTT neighborhood at that time. This includes factors like seasonality, demographics of the local population, etc.

Another high priority should be size of the item. With auto-hubs, the more unique SKUs, the better, and small items take up less space. Items should get ranking points for being small. Margins on the items. Higher margins will help finance the LTT construction and operation.

Expiry dates. For example, fresh limes may be fine for 2 weeks. Pine nuts may be fine for 2 months. If the data shows a very high probability they will be purchased well before expiration, they may be suitable for the auto-hub.

Importance to customers. Certain items may not be popular enough for the auto-hub, and yet customers may strongly value having fast, convenient access to them, in some cases-like Children's Tylenol, diarrhea medicines, thermometers, iPhone chargers, bottle openers, reading glasses, etc.

Reusable box compatibility: LTT is about extreme efficiency. Eventually most LTT items will be placed in the boxes by robots. A single apple would roll around in the box, so a human may need to be involved. Perhaps a special bladder box could be used to contain the apple, but would the apple try to roll out of the locker? Or what if the item is a liquid that has a small chance of leaking? There are several physical factors to be considered for box compatibility.

Other LTT compatibility issues: Onions could leave smells throughout the system. Any produce in a mesh bag may be ranked low, or be disqualified, to keep skins and flakes from getting in the tunnels and lockers. Mouse poison is often sold online, but would you want it delivered in the same box that is later used for your Pop Tarts?

Charging the carriers and pickers: Of course there can be charging stations, where the carriers dock to charge, as many robots do. However, whenever the carriers are not working, they will normally be in the auto-hub or CRU, either waiting for another order, or waiting in line behind other carriers to receive and/or deliver boxes. These areas can be fitted with charging rails, and the carriers can have charging brushes or contacts that electrically connect the carriers to the rails for charging along their normal routes in and around the CRU and auto-hub. Alternatively, these areas can use charging points or inductive charging for the carriers, or a combination of charging methods.

Carriers could run directly on the rail electricity throughout the entire LTT, eliminating the need for batteries. But it would be more expensive to install and maintain, and there are potential maintenance issues. Also, they would be vulnerable to temporary power outages, and possibly vulnerable to damage from construction workers, landscaping workers, etc. Also, rails could be in the way of maintenance robots that clean up spills or remove water or mice or perform other tasks. System-wide linear induction has similar benefits and drawbacks.

So in LTTs, these "in-path" charging rails (in auto-hubs and possibly CRUs) would be similar in some ways to model railroads, and streetcars. Most model trains get power from their metal wheels contacting the electrified rails. Streetcars get power through raised arms contacting overhead electrified wires. The LTT carriers could use either of these systems, or the others discussed above.

Again these rails would only be in the auto-hub and CRU areas, where carriers wait for orders, and only in areas conducive to human access, to simplify installation and maintenance. When a maintenance issue arises, such as brushes or points not making proper contact, a notification would automatically be sent to maintenance, and the "problem carrier" can be removed for repair. Streetcars and model railroads have shown that their technology occasionally needs service, which would be much more difficult if it occurs deep inside the tubes. The battery model is lower maintenance, and will also have a smaller capital investment.

The main purpose of the auto-hub is for the super-fast orders. But the auto hub serves a second purpose: a buffering system for lockers. As an LTT bonus, this is a huge savings and efficiency compared to banks of 60 lockers, cutting the number to a few lockers instead.

The auto-hubs can even have shelf units that shift, when carriers need room to enter an aisle. This allows most shelf units to be almost right together. The preferred embodiment does not use shifting shelves though, as each shelf unit has a picker on a rack (the picker travel frame, which is a 3D printer-type rack, as discussed earlier in this paper)

Eventually something will go wrong inside a tube. An item will fall out of a carrier. A mouse will get in. Water will get in. Construction workers will jackhammer into it. But the tube will not have to be dug up every time there is a problem. Many of these situations can be managed by specially designed robots, built to perform certain inspection or maintenance tasks, either automatically, or by remote control.

Other preemptive measures can also be taken, such as the slight sloping for drainage discussed above. And tubes can be just large enough that a small person can actually enter the tube system on a low profile dolly, similar to a mechanic's creeper, which may be motorized, so the person can quickly ride throughout the LTT to find and fix problems.

Theft of packages from vans, or theft of vans themselves: The LTT system and cartridges are designed to be secure against theft. The cartridges fit tightly enough that boxes can't be accessed by people, without the cartridges being removed from the van, which requires an unlock code, wirelessly sent from the CRU, but only when the van is properly interfacing the CRU. So even if a thief steals the entire van, it will take a lot of work with heavy tools to access the contents. But stealing the vans will be difficult, since the driver makes far fewer stops, and won't need to get out of the van, when the cartridges are being transferred automatically.

How a Carrier Accesses a Locker

Figure 14:
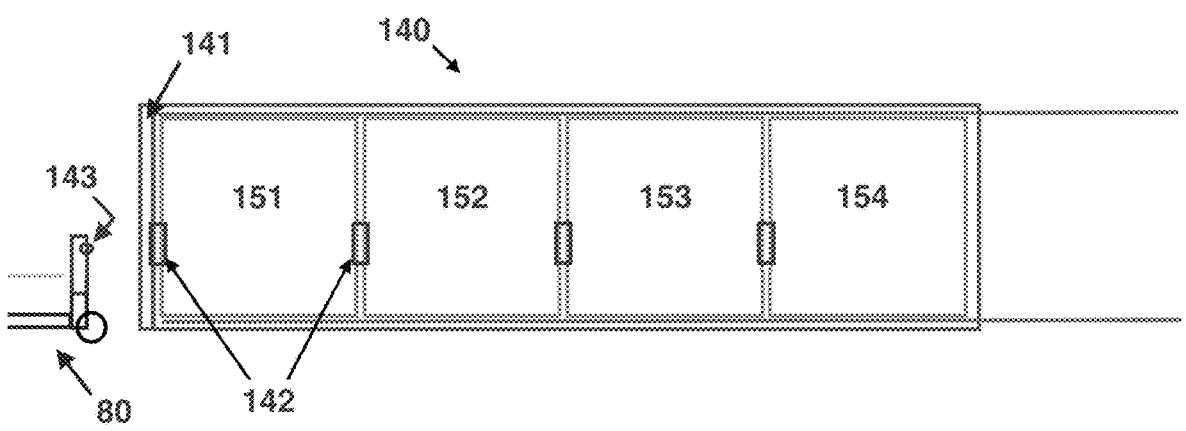
FIG. 14 is a side view illustrating a carrier in association with a locker having four cells.
Figure 15:
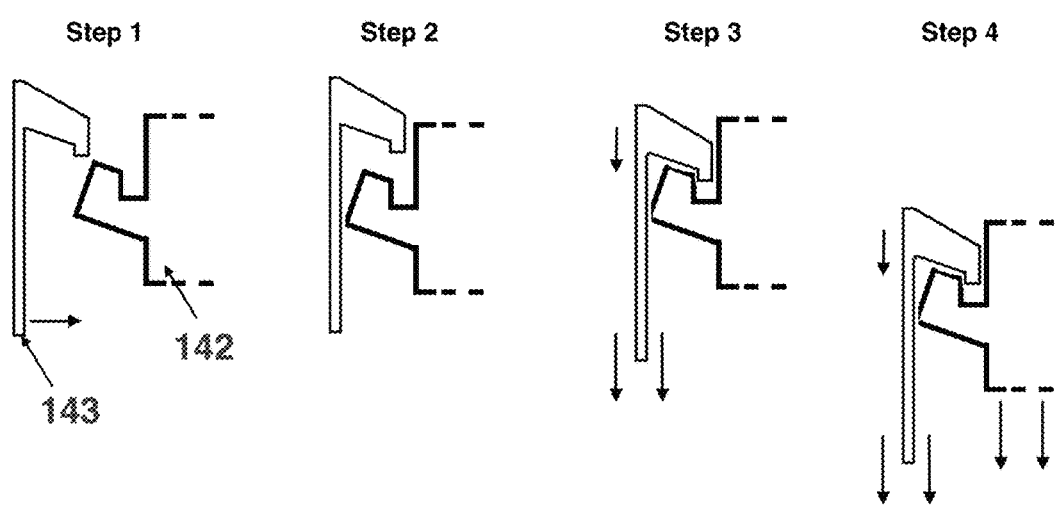
FIG. 15 illustrates a carrier catch working in cooperation with a locker latch.

People access the lockers from the front, but the carriers travel in a protected space in the area behind the lockers. Using a latch mechanism on each cell's back door, the carrier unlocks and slides open the door. FIG. 14, shows the back of a locker 140 with four cells, with the Carrier 80 arriving at the locker (from the left in this example), first encountering locker Cell 151. Cell 151 back door is latched to the jamb 141 (on its left in this case, since the carrier enters from the left), with a latch 142, which the Carrier 80 opens with its catch 143.

There are several embodiments of the catch 143. One is shown in the 4 steps of FIG. 15. In step 1, the Carrier 80 has extended the catch 143 toward the locker (upwards in this overhead drawing), and is moving forward to position catch 143 to engage latch 142. Step 2 shows catch 143 is now in position. In step 3, the Carrier 80 is pulling catch 143 back, which engages latch 142. In step 4, the catch has pulled the latch back (down in this overhead drawing), which unlocks the cell door.

Referring back to FIG. 14, next the Carrier 80 moves forward, which pushes cell 151 door to the right, via the catch C, which is still engaged with latch L. As cell 151 door slides right, it pushes all the other cell doors to the right too. All cell doors ride, slide or glide on the same 2 rails G—an upper rail and a lower rail. Cell 152 door is latched on its left, to Cell 151 door. Cell 153 door is latched on its left, to Cell 152 door, and so on. So each cell's back door is latched to the door to its left, except Cell 151 door, which is latched to a stationary door jamb J. The Carrier 80 stops in position to transfer its box into cell 151.

After the carrier makes its delivery, it moves in reverse, pulling the doors closed via catch 143, which is still engaged with Latch 142. When the door is closed, the catch 143 disengages, by reversing the steps in FIG. 15, and the carrier can begin another task.

If a carrier is making a delivery to Cell 152, it goes past Cell 151, and pulls up to the point where its catch is adjacent to the 2nd latch. The catch protrudes, and unlatches Cell 152 door. The carrier proceeds forward by the width of a cell, thereby pushing Cell 152 door open. Cell 152 door is now behind Cell 153. Cell 153 door is now behind Cell 154. Cell 154 door is out to the end of the glide rails. Cell 151 door, hasn't moved, and is still closed (behind Cell 151). Next, the carrier makes its delivery into Cell 152, and then moves back, pulling the three doors (152, 153, and 154) into their original closed positions. Then the catch 143 is retracted, and Cell 152 door latches.

Now the carrier can continue its work. Its next job may be to retrieve an empty box from Cell 153, so it moves forward to align its catch 143 with latch 142 of Cell 153, and follows the same procedure to access Cell 153.

The doors use high quality durable hardware that allows them to easily and reliably latch and glide many times without maintenance. Bearings in the gliders can minimize torque on the carrier, as it pushes multiple doors open and closed with its catch 143 protruding from the side of the carrier. However, in the short pathway behind the lockers, there are ways the carriers can be guided to counter any torque produced by pushing the doors. Rails can guide the carrier wheels, or rollers on the locker frame and on the wall behind the carrier path, can keep the carrier corralled in the right position and direction.

Public LTTs

The idea of having LTT lockers in hotel lobbies, dorm lobbies, etc. can be expanded to businesses and other public places too. For example, businesses that want more traffic might pay to have an LTT locker. The business might get a locker with only 2-4 cells, which takes up very little space, and the vacant office building behind it, for example, is converted into an auto-hub. In this example, the high value real-estate adds a locker with a very small footprint, but it brings lots of traffic to that business. Yet the items are stored in an auto-hub on low value real estate.

Anyone walking or driving down the street, can get on their app, and order standard LTT items, and see exactly where to go to get those items at the nearest LTT locker. That locker may be at a grocery store, a restaurant, a gas station or anyplace that has the lockers, and has low value real estate somewhere nearby to locate an auto-hub. Any one of these lockers can also be used as an upload point for authorized businesses and users. Carriers can take uploaded items from the lockers to the associated auto-hub, and load it into the next cartridge where it will go back to the WAH, and automatically get routed to its destination. If it is urgent, and there is a drone port at the LTT, the delivery can be extremely fast. Since the pandemic has made work-from-home more common, there is much more empty office space near retail businesses, creating many locations with excellent LTT opportunity.

Other potentially good places for LTT lockers: convention centers, event venues, hospitals, libraries, nightlife areas, factories and other workplaces with lots of workers, popular urban trails, theme parks, airports and train stations, rest stops and visitor centers, museums, sports complexes, fitness clubs, theaters, etc. You forgot your reading glasses, and can't read the playbill or program. Order it on your phone, and 1 minute later it's in the locker in the theater lobby. Or your dog ate chocolate, and you need hydrogen peroxide quickly to make him throw up. At any important event, your hearing aid battery dies and you need another one quickly. LTT could even be lifesaving, with quick delivery of fire extinguishers, jump-boxes, EpiPens, Narcan, emergency medical kits, etc.

So what is the LTT system design for delivering directly to apartments?

There are many apartment building designs and therefore many LTT possibilities, but certain elements may be common to most or all of them. For example there are several possible uses for the elevators discussed above, like lifting the carriers to the various floors of buildings, or lowering the deliveries to a convenient level inside the apartments. For example, when running a tube down a hallway to various apartments, in either a retrofit or in new construction, it makes sense to put the tube up high and to the side, away from the lighting, sprinkler system, signage, etc. and above the doorways, so as to not encroach on other useful space. Therefore, the tube, bulkhead, rail, cable, or whatever travel path is used, will be high, and it will deliver to the apartments from a high point, which can be done with the elevator. Alternately, a human powered dumbwaiter could be used.

Figure 16A:
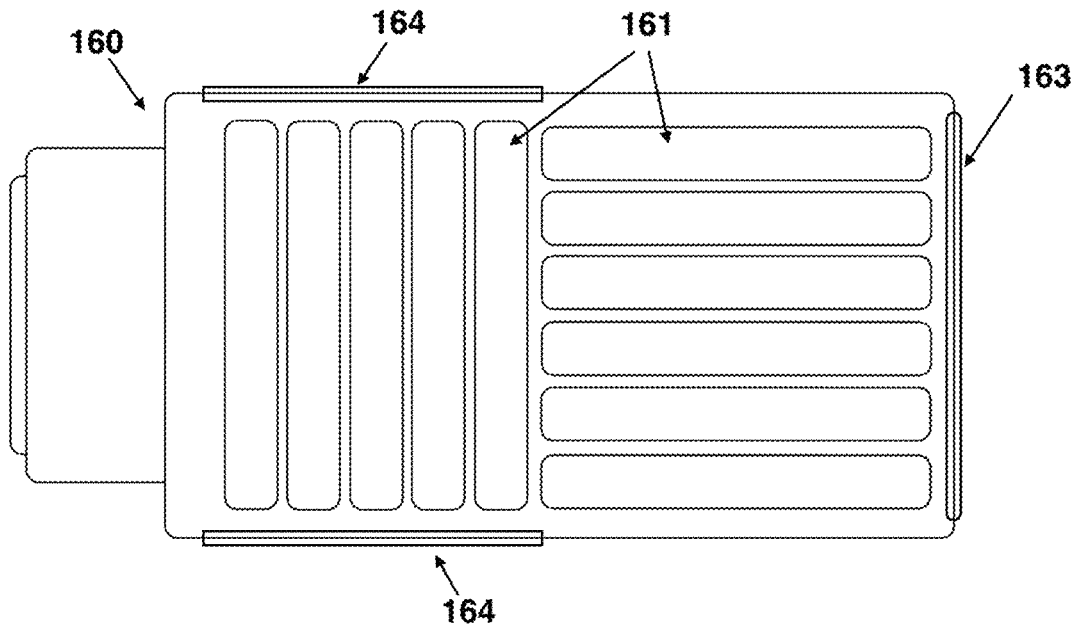
FIG. 16A is a plan view of a van carrying a plurality of cartridges.
Figure 16B:
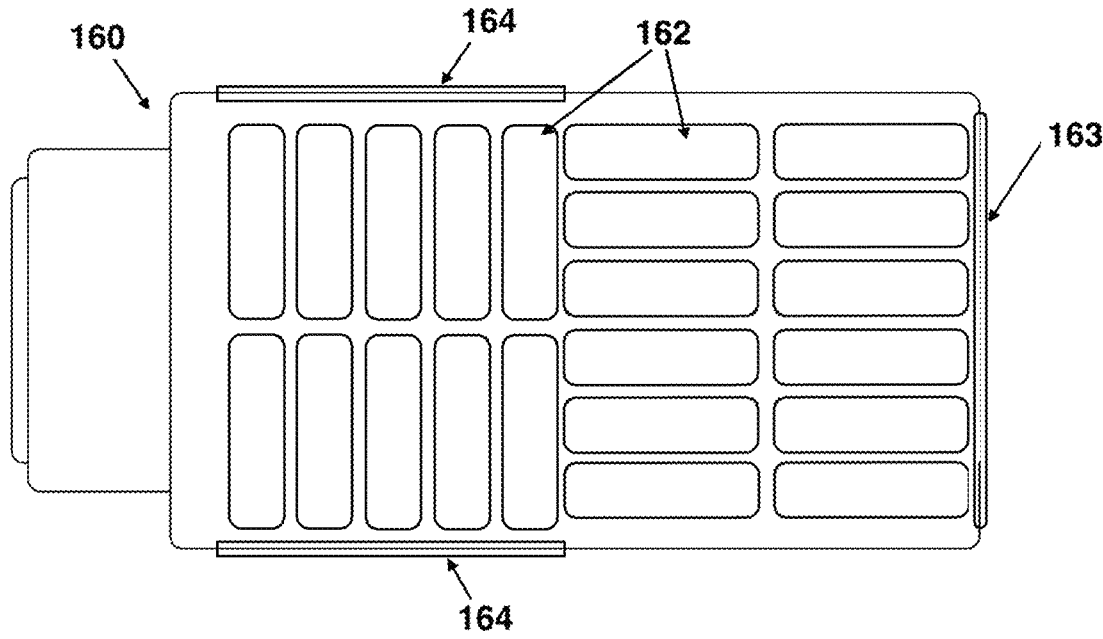
FIG. 16B is another plan view of a van carrying a plurality of differently sized cartridges from those of FIG. 16A.

As mentioned above, the LTT system includes cartridges of various standard sizes. FIG. 3 includes a van carrying four full-sized cartridges. The van 160 in FIG. 16A is carrying 11 half-size cartridges 161. The van 160 in FIG. 16B has 22 quarter-size cartridges 162. 163 is the back door, 164 is the side doors.

In subdivisions and places where LTT tubes are run under streets, sidewalks, and through utility easements, or any place where it is conceivable that backhoes will be digging someday (like to repair a sewer line or something), the depth and route of the LTT tubes is important. A certain height (perhaps 2-3 feet) above the LTT tube, a "shield" can be buried. The shield can be thin and cheap, and is not there to physically stop a backhoe, but to show the backhoe driver that something important is there, before he digs into it. The shield can be printed or etched with written notices.

a. In areas of the country where warehouses are far from the LTTs, intermediate WAHs can be built at strategic locations in between. Items can still be boxed and stored at the main WAH, then sent in large cartridges to the intermediate WAHs, where the cartridges themselves are sometimes simply delivered and stored, doubling as additional shelves, holding items for further distribution to LTTs when needed.

RTT (Railroad Tube Transport)

Large retailers and logistics companies have complex systems for transporting goods, for which they are always trying to improve cost, speed, reliability and efficiency. RTT (Railroad Tube Transport), another component of the current disclosure, may be part of the solution. RTT involves the vast US railroad system, and using its incredibly unique infrastructure in a totally new way. If tubes were buried alongside tracks, items and packages can be shot through the tubes at high speeds to quickly alleviate bottlenecks, smooth inventory variations, and increase delivery speeds between nearly all major cities.

Another component of the current disclosure, aims to solve the problem of installing these tubes. Trains and railroad tracks are tremendously strong, and can be used to support completely new types of equipment for continuously trenching, laying pipe, and burying pipe at speeds and costs that seem outrageously impossible by today's standards. This new pipe installation system could be 500 times cheaper and faster than traditional methods.

Railroad Tube Transport (RTT) can transport small sortable items over long distances at high speeds in buried tubes alongside existing railroads. At 140,000 miles, the US has the largest railroad network of any country in the world (includes short and regional railroads, but not switchyards and double tracks. See map of the major networks at i.imgur.com/4TYsU.jpg). Connecting all major cities, and thousands of small cities and towns, railroads pass through areas where lots of commercial land and existing warehouses are readily available in, and near those cities. This totally unique massive network is privately owned by only a few companies, and is an amazing opportunity for creative quantum leap innovation in transportation. Imagine, in current times, attempting to build a 140,000 mile private physical network, cleared of buildings, forests, geological impediments and land-rights issues, and then building thousands of bridges, and large-scale heavy infrastructure for transportation of materials, equipment and workers. Even if it were possible, it would cost trillions of dollars and take decades. That's what the railroad network represents, as is.

With some additional ingenuity at the warehouse level, RTT can quickly move items from a shelf in one warehouse onto a shelf in another city with no human hands involved. Packages can be sent via RTT individually, or in strings, or even long "trains" over short or long distances. RTT will be ideal for automation, reliability and speed,-just the opposite of the status quo: load and unload a diesel truck, driving it through traffic jams, bad weather, accident sites and construction zones on roads with speed limits far slower than RTT.

Development of big novel ideas often draws on multiple existing technologies, and usually ends up contributing still more cutting edge technologies, or sub-innovations, some of which have great importance of their own. These new advancements often come from experimentation, which obviously Tube Transport needs a lot of. For package propulsion, these experiments may involve MagLev systems, using football shaped pods (perhaps "LevPods") to carry the items, or high speed motorized package carriers that run on wheels or even fly through the tubes using axial flux motors, or miniature linear induction motor lines, aerodynamic or aerostatic air bearings, perhaps even rifling the tubes to impart spiraling for the LevPods, or even using compressed air like a pea-shooter. It may be worth experimenting with the old vacuum tube technology, or combinations of several ideas, like a combination vacuum/compressed air/linear induction system.

RTT tubes might be as little as 8" diameter, or as much as 20" or more. Determining the optimal size will involve several factors, like results of propulsion experiments, the distribution of sizes, shapes and weights of small sortable packages ordered in a typical year, and the cost of pipe, and its installation. LevPods or packages may need to be a specific cross-sectional size and shape to help mitigate friction and air-resistance. Other ideas may also mitigate friction, such as partially, or mostly evacuating air from the tubes, or even creating air flow in the direction of package travel (each "line" will contain at least 2 tubes, so packages can go both directions simultaneously).

Laying the pipe: Another key, is finding an affordable way to install thousands of miles of pipe. Today, laying pipe involves several major steps: 1. Slow, expensive truck and trailer transport of equipment, workers, pipe and supplies to the job site. 2. Clearing of any brush and trees, sometimes even strips of forest, then grading, to make way for trenching operations. 3. Digging trenches with backhoes. 4. Manually connecting pipe lengths together, either in the trench, or beside it, then carefully lowering it into the trench. 5. Burying the pipe with front loaders and backhoes. 6. Repairing the large area damaged by all the equipment. 7. Loading and transporting the equipment to be hauled away.

To install a single mile of pipe can take several days, weeks, or even months, depending on the situation, with workers traveling to and from the site every day. A two minute video of typical pipe laying can be seen at youtube-.com/watch?v=47yFvw01Jyw. A few large commercial operators do have specialized equipment for larger scale trenching, but this has limited applications and, while faster than traditional trenching, it's still extremely slow compared with the proposed system herein disclosed.

For RTT, the new railroad trenching system will be completely different, and much faster. Here's how: While slowly, continuously cruising down the tracks, a "work train" pulling several specially designed train cars will use multiple constructs of out-rigged equipment to:

trench with a plow, lay a bed of gravel lay continuous pipe into the gravel bed

Use a 2nd plow to bury the pipe with the removed earth from the first plow shape and tamp the backfill add a finish layer, such as gravel, mulch, straw or seed, and even fertilizer and water.

Each step can be done simultaneously, one step behind the other, by different specialized parts of the train as it continues to roll, non-stop. Once the process is dialed in properly, no workers should need to leave the train, until crossroads are encountered, as discussed below. Unlike current pipe laying, there will be no need for clearing brush or trees, as railroads are already kept clear for a wide area on both sides. Also, the wide swath of surface damage typical with current trenching methods, will be almost completely eliminated.

In the many areas where railroads are uninterrupted by cities and towns for long distances, this continuous system can work exceedingly well. In those areas, the job might be 500 times as fast and cheap as current methods—maybe even faster, as the technology improves.

Routing the Packages:

To use an example, Alliance, Nebraska is hundreds of miles from the nearest big city. It has major BNSF operations and a large switchyard where railroads intersect from different regions of the country. In towns like this, where railroads intersect, RTT packages will need to be routed correctly. Automated sorting centers can receive incoming packages, and automatically route them to the appropriate tubes for further transport to end destinations. Radio tags or bar codes on the packages or LevPods can determine which way they are shunted.

Many such intersections will be near towns like Alliance, and there are other small towns located all along the railroads. Many of these towns could also host smaller centers for receiving packages from RTT, to distribute by van or truck to their end destinations in their respective local areas, which will benefit from faster and cheaper delivery of goods. Tube Transport will have a tremendous advantage over its competition in delivery of small items to these areas. And there are many such places, precisely because the railroads were there when these places were populated. Since the US Postal Service, and other carriers also deliver packages and mail to these areas, there could be great opportunities for subcontracting, using RTT to these towns and everywhere else. RTT could make US Mail go faster, easier, cheaper and greener to much of the US population. RTT will be discussed in more detail below.

Utility Tube Transport (UTT): Today, trenching can involve lots of permitting, planning and red tape. But with railroads already owning the land rights, less paperwork will be needed for RTT installation. There is a similar precedent for this, with the telegraph lines that were installed alongside railroads, using trains to carry the poles, wire, work crews, etc. Telegraph companies captured the value potential of these super long, privately held strips of land that had built-in transportation along the route. Soon, telephone and electric lines were also run this way, and of course, they were also built far beyond the railroads, to nearly every residence and business, requiring an immense amount of right-of-way and easement work, as well as clearing millions of miles of trees, brush, boulders, buildings, and other obstacles. In some cases, huge excavation projects were undertaken, especially in wooded, hilly areas, so the utility lines could be run. Today, these massive grids of utilities can be viewed as a network of property rights to already-cleared, graded, erosion-mitigated physical arteries, representing an amazing opportunity. Two of the biggest utility networks are pipelines and electric lines. See US map of pipelines at https://submar.com/where-are-pipelines-located-almost-everywhere/and map of US transmission grid at https://commons.wikimedia.org/wiki/File: UnitedStatesPowerGrid.jpg. Tube Transport can make use of these utility networks to install additional tubes, connecting many warehouses not located on railways.

Tube Transport installation along most utility routes (UTT) will be more difficult and expensive than RTT on a per mile basis, because UTT cannot use the giant railroad installation equipment. In some locations, these more traditional tube installation methods would simply not be worth the investment. But in many other locations, it surely will be. Tube Transport can make use of these utility networks to connect many existing warehouses to the railways and to each other. They can also connect to new small warehouses or hubs that store the items most commonly ordered in each region or local area, thereby increasing delivery speeds and ease in those areas. And perhaps development of UTT will benefit from all the new knowledge and technology gained from RTT, as well.

A tube checking robot can be inserted into the tube to check it during installation of the tube. Before a section of tube is backfilled, the checking robot can check the level or grade, check for any accidental bumps or dips, and use HD cameras with certain visual filters to look for bad couplings, and other issues. After a section of tube is backfilled, the checking robot can look for distortions or smashes caused by tamping in the backfill. It is best to check these things while the installation crew is still there with their equipment.

There are also utility line opportunities in millions of specific locations around the world. One such idea is "Local Utility Tube Transport" or LUTT, where a delivery van goes around to various "Local Delivery Portals", and transfers a cartridge filled with packages, from the van into each portal. The portals are similar to CRUs of the LTT system, but many portals will only accept 1 cartridge at a time, as demand dictates. Each portal is connected (via underground LUTT tubes running through utility easements) to a group of neighborhood homes or buildings. Of course, this is very similar to LTT and its cartridge system, except the tubes are run through utility easements. LUTT can be thought of as a hybrid of LTT and UTT.

Figure 17:
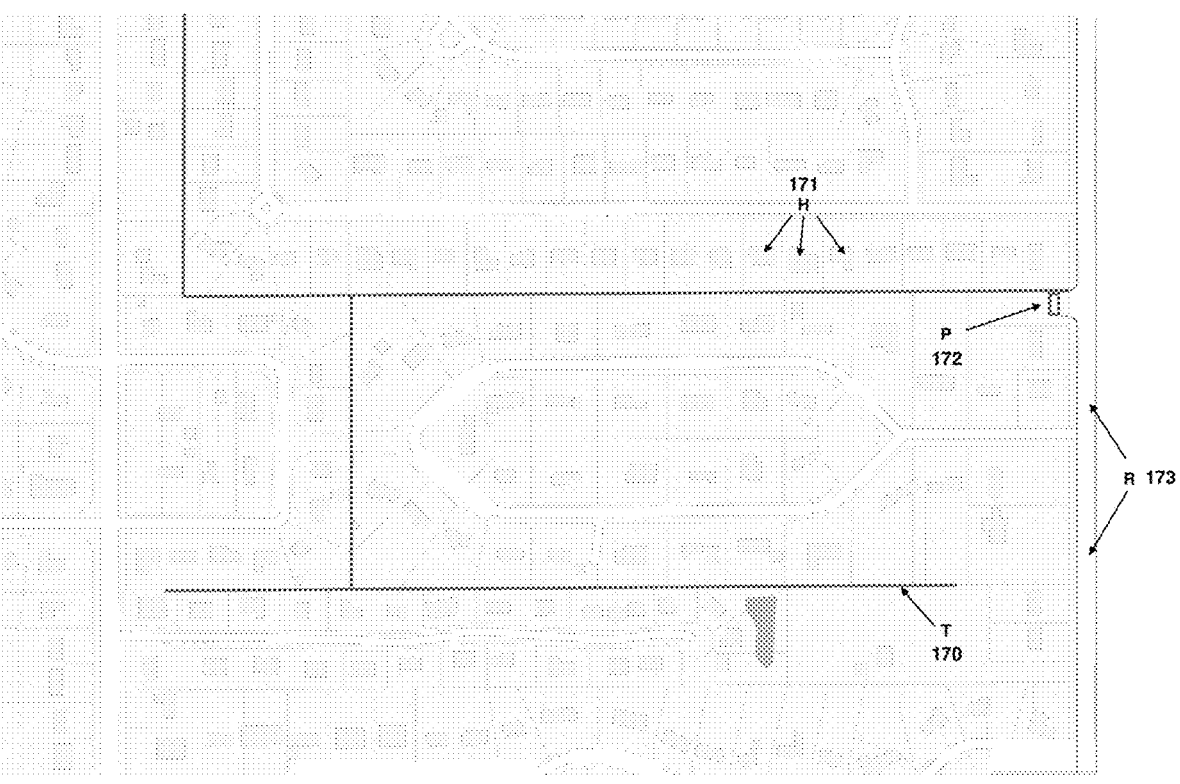
FIG. 17 shows a plan view of a neighborhood with an existing spur of overhead utility lines serving a number of homes and an associated local delivery port.

FIG. 17 shows a real neighborhood with an existing spur of overhead (electric, cable, phone, fiber) lines 170, serving homes 171. The lines run through easements along property lines behind each house, which is common. The dark rectangle represents a potential location of a local delivery Portal 172, where a delivery van can drive to it on roads 173, pulling just off the road 173 to dock with the Portal 172, to deposit a cartridge of orders, and pick up an empty cartridge.

The cartridge transfers can be automatically done with a mechanical system extending from the van, with little or no human involvement. Eventually the delivery vans may even be driverless. When self-driving vehicles finally become a reality, it will drastically change business for all sorts of companies and people who can find ways to leverage it. But without radical new innovations like LTT and UTT, it may be difficult for delivery vans to fully leverage self-driving, since there is an endless variety of ever-changing end point delivery issues, some of which seem nearly impossible to solve with artificial intelligence.

Having delivered the cartridge to the portal 172, the van continues on its route, while the local delivery robot starts its work. The robot, which can be the same carrier used in LTT, or a modified version of it, has been staying underground in its LUTT tube, until notified of this new delivery. Staying underground helps protect the robot and its battery from the natural temperature extremes above ground. Once notified of the new cartridge, the robot goes (within its tube) up to its delivery portal and begins systematically delivering each package to its final destination address, based on each package's RFID.

LUTT carriers can be cheap, simple, wheeled vehicles, with batteries that charge with electricity provided at the portals by solar power and/or traditional electric lines (which should be very convenient, since LUTT will often use power line easements). However, each robot should run a very small fraction of each day, giving it plenty of time to re-charge, and with ample solar power available in most locations. The LUTT carriers will be very similar or identical to LTT carriers, and can use the same elevator system, and the same reusable boxes discussed above, since the boxes will not be exposed to weather or human handling.

The robot starts by taking a package from the first slot of the cartridge, reading the RFID to determine the delivery address, and taking the package, within the underground tube, to the personal portal at that address. The personal portal might be inside of a home's attached garage, for example, and might be a permanently anchored container at counter-top height. The robot unlocks and opens its door to the personal portal, then gently dumps the contents of the reusable box into the personal portal, then leaves the personal portal, closes and locks its own door to the personal portal, and possibly one or more additional steps, such as unlocking the human user access door to the personal portal, depending on any access authorization protocols of the residents, users or receiving parties. It may also chime or send a photo and notification through the wireless doorbell.

Next, the robot goes back to its Local Delivery Portal to return the first reusable box into the cartridge, then takes the 2nd package (in another reusable box) from the cartridge, reads its RFID, and delivers it to its designated address. Likewise, the robot repeats the process until all packages are delivered in that neighborhood. Finally the cartridge is full of empty reusable package boxes, ready to be picked up by the next delivery van, whenever it makes the next delivery to that local portal. The RFID tags stay permanently attached to the reusable package boxes, and with each reuse, software will associate the RFID tag with a new destination address. Those new associations are communicated to the appropriate LTT robot, possibly wirelessly from the van when it makes the delivery.

In another embodiment, the carriers do not dump the orders. Instead, they deliver the reusable box into the personal portal, and the customer retrieves the order from the box. The personal portals can be either single or double unit design (or more). With the double unit, the carrier will first deliver the new order, then pull forward one space to retrieve the empty box from the last order, and return that empty reusable box to the cartridge at the Local Delivery Portal. With the single unit, the carrier is notified when a customer has retrieved an order from their personal portal, then the carrier will retrieve the empty reusable box. This clears the portal for a new delivery in the future. If a customer has not retrieved an order from their portal when they place a new order, the customer will be notified that their new order will not ship, until their personal portal is cleared. The double unit design, (or even triple, or more), can prevent this situation, by allowing more than one delivered order to be in the portal at once.

Local Delivery Portal design is similar to the CRU, with the cartridge being progressively lowered to the carrier level, where the carrier(s) can access any cartridge cell on each progressive level. Local Delivery Portals also have storage shelves for excess boxes, to buffer the number of various box sizes waiting to be returned to the warehouse. For example, if several large boxes have been delivered recently in a particular LUTT, and then suddenly all of them are emptied at the same time (customers simultaneously retrieve their orders from the large boxes in their respective personal portals), then suddenly there are lots of large boxes to return to the warehouse.

If the large boxes cannot all fit in the next cartridge, some will need to be stored until a time in the future when there is a cartridge with room. If the Local Delivery Portal shelves ever reach their capacity of extra boxes, a van can be sent with plenty of empty cartridge cells to clear the shelves at that Local Delivery Portal.

With 90 homes currently served by 1.5 miles of electric lines, the neighborhood diagramed in FIG. 17 may be worth the investment to install a spur of LTT, depending on several other site-specific factors, such as density of trees, and the presence of any underground utilities, backyard fences, and other obstacles. Another factor may be the ability of homeowners to pay for part of the spur, or perhaps pay for individual connections to their homes. In neighborhoods where online ordering is frequent, and homeowners are wealthy, there should be ways to find an arrangement that works well for all parties involved. Obviously LTT can be far easier to install in new subdivisions, as they are being built, and that might be a logical first implementation of LUTT.

In regions where utility spurs like this are prevalent, there can be tremendous efficiency gains over today's delivery systems. It should be quicker for a van to drive up to a portal and auto-swap cartridges for delivery to an entire neighborhood, than it currently takes for one delivery to a single home. An obvious disadvantage to LUTT, is there will always be some items that are too big or heavy to fit in the various standardized reusable cartridge boxes, and those items will still need to be delivered by traditional means.

An advantage of LUTT is that the technology within each spur is not complex or demanding. The carriers will be relatively cheap, and need not be high speed. The carriers can follow a simple wire guidance system in the underground tubes or visual guidance lines within the tubes. Using IOT, the progress of each carrier's deliveries and battery life can be tracked by servers, so that notifications can be sent if anything goes wrong. Carriers can be equipped with cameras to aid in maintenance checks and troubleshooting.

Cartridge and carrier elevators: The elevators have very simple designs, and will be very durable and reliable. However, they are designed as single drop-in units, which will help in the rare event that maintenance is needed. The housing of the elevator shafts are vertically slotted, so the entire elevator assembly can slide down right into the correct position. Removing the assembly for maintenance will be just as simple.

LUTT in combination with the small warehouse-hubs mentioned above can also revolutionize the spot-delivery market that includes Amazon Fresh, DoorDash, UberEats and others. Local restaurants, grocers, and other businesses can "upload" orders via LUTT to the local hub, which sorts and sends orders in vans to the correct Local Delivery Portals, where the local bots deliver the butter or hamburger or flowers or whatever it is. If the item is fresh or time sensitive in some way, therobotcan prioritize by postponing other deliveries.

Two long term trends are: ever-increasing online shopping, and ever-increasing human labor costs. Both trends will add to the value proposition of LUTT. And with LUTT adding speed and fantastic convenience to the end users, online sales could increase even more.

Other revenue sources should be possible too. Almost every day, US mail is delivered to almost every house in the country. And there are deliveries from other logistics companies too. The owner/operator of the LUTT system should be able to subcontract to deliver for these and other companies, increasing the number of areas where LUTT is viable.

More detail on pipe laying equipment and process for Railroad Tube Transport (RTT):

Transporting RTT equipment, workers and supplies can be hundreds of times quicker and cheaper than current trenching and pipe laying, for at least these reasons:

Trains can carry far more than trucks, and trains don't stop for traffic lights, ambulances, traffic jams, etc. The worksite will always be right next to the train, and the digging equipment will no longer need to be unchained and off-loaded from trailers. Instead, the equipment can be mounted onto specialized train cars and operated right from there.

Workers can live on the trains. In rural areas, the pipe laying trains might lay 50-100 miles per day, or more. So it makes no sense for workers to drive in their vehicles to a new hotel every night. Instead, train cars can be converted to sleepers, diners, game rooms, kitchens, theaters, exercise gyms, libraries, laundry, snack bar and convenience store, etc. So the crews can live on the train for weeks at a time, while working in shifts. For example, 1st shift 6 am-3 pm, and 2nd shift 3 pm-midnight, and no work from midnight to 6. 18 hours of continuous progress, daily. Periodically, a road-rail vehicle can be driven to the nearest town to restock food and drink supplies and/or do laundry and whatever else is needed.

Trains often pull more than 100 cars, and sometimes over 200. Plastic pipe isn't heavy by railroad standards, so depending on pipe diameter, one train can easily haul 100-200 miles of single pipe, or 50-100 miles of double pipe. But with such rapid progress, pipe and supplies will get used up quickly, even with the longest trains. During the night, the train could haul the empty pipe cars to the nearest switch yard, where a line of fully stocked pipe cars is waiting to be swapped. Or, supply trains could bring supplies of pipe right to the work train. This might require construction of a conveyor system to move bundles of pipes from the supply train to the empty pipe cars of the work train. Similar conveyors will be needed along the work train to supply pipes to the assembly and pipe-laying machines.

Installing the pipe can also be done hundreds of times quicker, cheaper and more efficient than current methods, for these reasons:

i. Digging can be done with a specially designed giant plow on an outrigger extending from the train, and possibly having stabilizing wheels extending out past the plow. Specially designed heavy "Ballast cars" can provide stability to the out-rigging, allowing much greater speed, as the giant plow can be forced through the ground using the momentum of the train being pulled by the powerful engines. Struts can connect the cantilevered equipment to multiple cars at once, allowing more strength than needed. In some cases, one pipe could be installed on each side of the train, which can allow the forces from the 2 plows to balance to some extent, making the trenching process even more stable and potentially faster. However there may also be reasons to bury both lines together in the same trench.

ii. The gravel bed can be laid with an auger lift extending from a hopper car. The auger rpm can be automatically controlled based on the speed of the train, which will control the gravel bed thickness and width. Again, ballast can also be extended on the opposite side of the train to help balance the auger, and any of the other cantilevered equipment.

iii. Pipe assembly cars can join pipe sections into continuous pipe, as boomed bearing feeders (basically conveyor belts cantilevered off the train right down into the trench) continuously feed and place the pipe into position. This is followed by a mechanism that checks and adjusts pipe alignment, and gently vibrates and pushes the pipe down into the gravel bed. Perhaps more gravel can then be added before it's ready for backfill.

iv. A second plow wedges the trenched-out earth back onto the pipes. The "second plow" will likely consist of multiple plows or graders, and this can be followed by tampers to pack the fill. Then depending on the desired finish, a surface treatment is applied, which may involve gravel, or seeding, and spreading straw or mulch. Straw chopper/shooters and grass seeders have been around for years, and can be directed accurately and easily. Modifying and fitting these to the work train is straightforward. Wind can be an issue with straw shooters, and it may be even worse to shoot it from a traveling train. To mitigate this problem, a water hose connected to a nozzle on the end of a boom can spray the shooting straw from above, wetting it and pushing it straight down into place.

It may be best to bury the pipe at some distance behind the pipe laying, by using a 2nd train at a later time, to allow for any issues found during inspection. This will also allow longer sections of unburied pipe to be aligned by machines that can ride on the pipe, using lasers to check and then mechanically adjust and verify the straightness of pipe over long stretches.

Installation Costs:

For RTT, overall installation cost is impossible to project at this time, but some calculations with estimates can be made for ballpark purposes. Plastic pipe producers are commonly located right on a rail line, so transportation costs of the pipe will be small in comparison to current methods that involve both trains and trucks, which have relatively tiny capacity. Since the volume of a shipment of pipes is mostly air, transportation is a large part of their cost, and trains are far better than trucks for this purpose.

Cost of the pipe: Depending on the diameter and thickness of pipe, it might cost as little as $1/foot, or $5000/mile, or $1.5 billion for enough to run double pipe along every mile of railroad in the country.

Cost of installation: If 35 highly skilled workers can operate all the equipment in both work shifts, with another 70 lower skilled workers doing support work, then labor cost might be around $95,000 per day. That's only $950 per mile on days when they do 100 miles. Trains are extremely fuel efficient on a per ton basis: about 1 gallon to move 1 ton of freight 500 miles. So overall cost could be under $200 per mile of tube, to operate the trains (work trains and support trains). Gravel in quantities this high should cost less than $5/yd, which might be about $500 per mile of pipe. The per-mile cost of train and equipment is tough to estimate, but will surely be a fraction of the pipe itself. If supplies and other misc costs were another $500 per mile, then the total so far is around $2.5 billion for the entire 140,000 miles. Even if we triple that number to guard against cost over-runs, it's still less than 10% of Fed Ex or UPS annual revenue, and less than 2% of Amazon revenue. All this ignores the cost of additional sorting/routing centers and the package propulsion system, the trestle installations and other costs that can't be estimated yet. Although this is just an exercise to begin framing a rough estimate, economic feasibility does not seem impossible—at least for much of the RTT network.

With today's extraordinary technology in cameras, sensors and guidance systems, much of the RTT pipe installation can be automated, so the number of workers required can be minimized. Again, all installation steps can be completed from equipment attached to the train as it travels. Although it will be expensive and difficult to develop all this new equipment, it should be simpler and cheaper than the development of today's TBMs (Tunnel Boring Machines)

was. It will also be simpler and cheaper than the equipment to lay undersea gas pipe, like the 760 mile Nordstream and Nordstream 2 (45″ diameter steel pipe wrapped with thick concrete). That installation achieved as much as 3 km per day, using continuous production techniques.

With RTT installation, most development will involve well known engineering principles. For example, to reinforce stability and strength to train tracks under the cars that take punishing forces from the plowing, a plate or truss with locked wheels can be lowered onto the tracks under those cars, and rigidly locked to identical trusses under the cars ahead and behind. This will provide an incredibly strong support to disperse forces over a very large area of tracks. Also long support/stabilization arms can attach the trenching plow directly to the front and rear plates or trusses. This long plate idea might only work on straight and "nearly-straight" sections of railroad, however "straight" is, by far, the most common direction of railroads, so this method can be used most of the time, allowing even greater speeds on the straight stretches. Similarly, many other problems in building the installation equipment for Tube Transport should be solvable with known techniques and engineering principles.

The supporting trains: Rolling ahead of, and behind the work train, are support trains. One support train is the residence train, which separates the off-duty shift workers from the noise and vibration of the work train. The residence train might be a few miles ahead, or even 20-50 miles ahead, perhaps parked and waiting for the work train to catch up. One of the support trains might have offices, meeting rooms, maybe a parts supply store for the equipment, and even a machine shop for quick repairs. When any of these trains is to be parked overnight, or for anything more than very short time, it can be disconnected into segments that are spaced such that crossroads are not blocked by train cars.

Near towns and cities, there will be many obstacles to laying pipe. Some obstacles may need slow and costly traditional solutions, while others might utilize creative new solutions. For example, where the railroad crosses a gravel road, the train plow might continue plowing right through the road, with all the installation steps proceeding as if there's no road at all. But as the work train continues on down the line, a trailing support train (following close behind) stops to finish the road repair, by offloading a grader and any other equipment needed to finish the repair. The support train can use an auger lift to apply fresh gravel from its gravel car(s) where needed, and, when finished, catch up to the work train, ready to repair the next road crossing. It may also be possible to develop graders and other road repair equipment that extend from the support train to make the repairs without offloading equipment.

Where the crossroads are paved, similar methods can be used, perhaps using another support train, which precedes the work train by a substantial distance, to make long pavement cuts and cross cuts, and otherwise prepare the site to reduce damage from the trencher plow approaching on the work train. The pavement cuts will minimize repairs that will be needed by the trailing support train. The trailing repair train may also need to carry hot asphalt, steamrollers and additional equipment to repair pavement, as well as an empty car for pavement waste to be hauled away.

In areas where crossroads are more frequent, the rear support train may not be able to keep up, especially where roads are paved instead of graveled. One solution may be multiple rear support trains. Another solution may be a longer rear support train that drops off multiple repair crews at several different road crossings to be repaired simultaneously. When a crew is finished, the rear support train reverses, to retrieve that crew and equipment.

Clearly there are specific locations along many railroads that will require extra work to install the pipe—for example, where a trestle crosses a river or valley. In terms of distance, these spots are tiny compared to the length of the entire line. But they will present special problems and require far more time and manpower per mile of pipe. More traditional equipment and methods may be necessary, although it seems likely that some of the work can be done by novel specialized equipment. For example, trestles are often wide open on both the left and right. So special equipment booms can be extended over and down on one side, while counterbalancing ballast booms are extended on the opposite side for stability. The equipment booms may also need platforms for the workers using the equipment to build the pipe and secure it to the trestle. Other special situations will undoubtedly be encountered, but it seems none will be terribly difficult for engineering crews to solve.

Prior to the start of pipe installation, a crew with detectors including Ground Penetrating Radar will drive along the rail, mapping any giant boulders or underground obstacles that may present problems with the trenching. If the pipe size is small, and the topography and railroad bed type is suitable, the pipe might be buried within the existing man-made sub grade of the railroad bed. Obviously railroad maintenance engineers will be involved in such decisions. In these areas (where pipes can be laid in the bed base), which may be common, the existing fill should be more predictable and consistent. But if large boulders or buried obstacles are found, they can be removed with prying equipment mounted on a special car, to pry against a long area of the railroad berm to exert huge leverage without damaging rails or equipment. If any such work is needed, it would be done before pipe installation starts.

Of course, safety measures will still be taken in case of accidents from the plow hitting obstacles. Engineers can use spring supports, shear pins and other mechanical constructs to allow the plow to break away, partly or completely if necessary, without injuring the train, the tracks, or workers. A "pre-plow" can be used, that is much smaller than the main plow, with a much sharper profile, which precedes the plow by some distance, and act as the tip of the spear, so to speak. Similar to drilling a pilot hole, it will aid in guiding the plow, but also potentially detect any obstacles missed by the radar crew. But some obstacles found by radar, may be deemed harmless if deflected by the pre-plow.

The tip and blade of the main plow will likely take significant abuse, but the pre-plow can help extend the tip and blade life of the main plow. The tip (or blade) of the pre-plow will also take abuse, but it can be replaced without even stopping the train. This can be accomplished as follows: the outrigged fixture that supports the pre-plow is made long enough to support 2 separate pre-plows positioned in single file line with each other. The 2nd pre-plow can follow directly behind the first, but need not be lowered into the earth until replacement of the 1st plow is needed. Once lowered, without stopping the train, the 1st pre-plow is raised and removed from the earth, leaving the 2nd pre-plow as the new leader. Next, the 1st pre-plow is moved onto the train to be fitted with a new tip, while the 2nd pre-plow is slowly moved forward along the outrigged fixture, into the forward position, leaving a new position open behind it, where the "previously 1st" pre-plow will go, after receiving its new tip. Alternately, several pre-plows can be rotated into and out of duty, allowing each one ample time for tip replacement or sharpening and any necessary repairs.

This technique can be employed for the main plow too, such that 2 or more main plows can move in tandem, and one replacing the other without stopping the train. In a similar vein, there can be a series of different plows instead of one main plow. Each plow can perform a different function, such as spearheading, or slicing earth or removing it in various amounts of pitch or depth, or even "clean up" after the main trenching is complete. Plenty of space should be left between the plow and the gravel auger, to leave time for gravel bed inspection. This can be done with cameras and AI, or with human eyes, or a combination of both.

If a problem is encountered, an algorithm can immediately determine the next steps, which may range from a simple debris-clearing blast of air to something as major as stopping the train completely. Since the train would be traveling 10 mph or less, the stopping distance would not be huge. However, there can certainly be a specially built emergency brake or emergency disconnects. But this should not be needed, since many pipe supply cars can be placed between the plows and the gravel auger, allowing for ample stopping time and distance. But perhaps an even more efficient method would involve separating the work train into multiple trains for the entire project. The trenching train can precede the gravel and pipe-laying train by a safe distance, with another specially designed road-rail vehicle in between the 2 trains, which stops at each road-crossing to block cross traffic until the 2nd train arrives to complete the process. It might even make sense to divide the work train into as many segments as possible, so any delays in one section have less effect on the other sections.

In places where pipe must be buried further out from the railroad bed, or situations calling for a shallow trench, extra backfill can be carried in on the work trains themselves. There are many different bed and topography situations that will present challenges, but the number is finite, and each can be solved.

Installation of the propulsion system: Linear induction line is one choice for package propulsion. One problem is how to install the induction lines within the tube, while the tube is continuously assembled on the cruising train. One solution may involve rolling robots that travel inside a new section of tube, as the tube is being attached. The robots are in a well-defined environment, doing a well-defined task (affixing the induction line to the tube, straight along the exact bottom of the tube). In that continuous process, a section of induction line is inserted through the "on-deck" section of tube and connected to the previous induction line section, by a human worker or rolling robot inside the pipe. Next, the pipe is connected, and the rolling robot, which is always inside the most recently connected tube, rolls forward on its wheels, affixing the newly connected induction line to the bottom of the tube as it goes.

The precise location of the tube bottom can be determined by the rolling robot using visual guide-lines already marked by lasers on the insides of the pipe sections. The laser marks, which can be made at the pipe factory, can also guide other aspects of the installation procedure. Possibly a better alternative to marked pipe may be grooved & notched pipe, or a hybrid grooved & notched/laser marked pipe. If the pipe is manufactured with a groove straight down the inside wall, with tabs on one end of the pipe, and notches in the other end, then pipe fitting can be done with very high precision, and the induction lines can be fitted into the inner groove for high precision placement during fitting. The tabs and notches ensure that the inner grooves are always precisely aligned. If the rolling robot is made to span the inner diameter of the pipe, it can generate force to press-fit the induction line into the groove.

Tube Maintenance and Repair: As the Tubes are installed, sensors may be installed on the tube to communicate temperature, pressure, and any conditions of the tubes or contents that may be useful during its lifetime of service. Readings can automatically be communicated and monitored. Sensor devices can also be periodically sent through the tubes to inspect any developing problems, such as shifting tube positions, hot or cold spots, and damage, wear or deformation to the tubes and propulsion system.

The gentle curves, and well known uniformity and design of the railroads, railroad beds, and earthen berms, along with robust design of the tubes and tube system should lead to low maintenance conditions with the tubes themselves. The package propulsion system must be designed with similar reliability and durability. Eventually however, damage will probably somehow occur. Thieves or vandals may try to dig into a tube. An earthquake may open a gap or kink a line, or even tear the line. A raging flood may unearth a tube. Some of this can be monitored from cameras or sensors on trains themselves, as they pass on a regular basis, or from cameras atop nearby power line poles. Drones may even be launched from the trains, as they pass, to look closer at any potential problem areas.

Just as the railroad affords the opportunity for advanced, efficient installation equipment, it may do the same for repair equipment and operations. Although probably less automated, perhaps some of the repair equipment can extend from a train, to unearth the pipe, and make repairs with minimal hands-on needed from technicians.

RTT pipe thermal expansion and contraction: PVC pipe may, or may not be the best choice for the plastic pipe. But the expansion coefficient of PVC pipe is 5 times that of steel railroad rails. Rails can approach 200 degrees F. in summer, and −50 degrees in winter, but the tubes should only range from about 60-70 degrees, for several reasons:

i. The PVC will be buried in earth, which is an excellent thermal buffer. In the Northern US, the frost line can be 3 feet deep, but it takes a long time to freeze the earth that deep.

ii. During installation, insulation barriers can be laid or sprayed on the pipes.

iii. In extreme weather, it will certainly be possible to heat or cool the pipes, by heating or cooling the items that are sent through the pipes. With the earth as insulation, it takes a long time for the outside ambient air to heat or cool an underground pipe, so the temperature of each package sent into the tubes will have a lasting effect on the pipes. Sensors along the pipe can report pipe temperatures to a server, which can determine when it may be helpful to heat or cool the items being sent through the pipes.

This intentional heating or cooling should rarely be needed however, if the tubes are heavily used with packages that are within a normal temperature range. Also, the shipped items will not only be heating or cooling the tube itself, but also the earth in contact with the tube, which will provide additional buffering of extreme weather spikes. Also, with long distance shipments, the shipped items will transfer heat all along the tube, helping to buffer the weather variations from one region to another.

Anywhere along the line, pipe heaters or coolers can be installed along some limited length of tube, and the items transported through it will pick up that extra heat (or cold) and disperse it along the rest of the tube.

In places where tubes pass through open air, crossing trestles over rivers and valleys, the tubes can be super-insulated, to maximize the package-temperature buffering effect.

If there are times where item transport is slow, or there is a propulsion system stoppage, then air can be blown through the tubes to boost temperature buffering. But again, the system should be designed such that only extreme weather would threaten to cause expansion/contraction problems.

However some amount of expansion/contraction will occur, so expansion joints should be considered, and existing technology should be sufficient to do that. Perhaps the first RTT lines should follow southern routes, while thermal buffering and expansion joint solutions are tested in the north. In extreme northern climates, experiments may suggest insulating only the top ⅓ or ½ or ⅔ of the tubes, allowing some warmth to escape below, keeping the earth underneath tubes from freezing and heaving upwards. The ideal depth of the pipes may vary by location depending on several things, such as climate, topography, type of earth, and the profile of the railroad bed and adjacent land.

So far, this discussion has ignored heat generated by the propulsion system, which will depend on the final system design, and the amount of work it does (the amount of usage) at any given time. With the tubes being insulated by earth, there could be significant heat build-up from propulsion. Based on heat experiments with various propulsion designs, any of several heat mitigation solutions can be used, including heat sinks into the earth, coolant lines, or again, cooling the items sent through the tubes. There can even be special supercooling packets sent through the tubes, which can activate or release at certain points along the lines where cooling is most needed. Likewise, superheating packets can be sent through in extreme cold weather.

Ultimately, as RTT, UTT and LTT expand, they can begin connecting to each other at many points, which could potentially compound their benefits to bring faster, cheaper, more efficient, less pollutive and less wasteful operation to delivery, warehousing and logistics throughout worldwide supply chains.

Although the various embodiments of LTT and other tube transport systems have been provided herein, it will be appreciated by those of skill in the art that other implementations and adaptations are possible. Furthermore, aspects of the various embodiments described herein may be combined or substituted with aspects from other features to arrive at different embodiments from those described herein. Thus, it will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What is claimed is:

1. A transport system for moving a container comprising:
a shelf including a first platform and at least one first magnet, wherein the shelf includes a shelf slot arranged in the first platform;
a moveable carrier including a second platform and a plow with at least one second magnet, the carrier configured to position the second platform adjacent to and parallel with the first platform, the plow configured to move relative to the second platform between a first position and a second position, wherein the carrier includes a carrier slot arranged in the second platform;

a carriage configured to move between the carrier slot and the shelf slot, wherein the carrier slot and the shelf slot have a same cross-sectional shape, and wherein the plow is connected to the carriage; and
a container including a first magnetic surface area and a second magnetic surface area, wherein the at least one first magnet of the shelf engages the first magnetic surface area when the container is positioned on the shelf, and wherein the at least one second magnet engages the second magnetic surface area when the plow engages the container, the plow configured to push the container from the carrier to the shelf when moving from the first position to the second position, and the plow configured to pull the container from the shelf to the carrier when moving from the second position to the first position.

2. The transport system of claim 1 wherein the at least one first magnet is a permanent magnet and the at least one second magnet is an electromagnet.

3. The transport system of claim 1 wherein the carrier includes a plurality of wheels configured to propel the carrier through a tube.

4. The transport system of claim 1, the shelf further comprising a cam extending out of the first platform, and the carriage further comprising an actuator arm, wherein the actuator arm is configured to engage the cam and move the at least one first magnet relative to the first platform when the plow is in the second position.

5. The transport system of claim 4 wherein the cam and the at least one magnet are positioned on a leaf spring, wherein the actuator arm depresses the cam and moves the at least one magnet away from the container when the plow is in the second position.

6. The transport system of claim 1, the carrier further comprising a carriage drive including a tape and a gear, wherein the tape is connected to the carriage and wherein the gear is configured to extend the tape outwardly toward the shelf or retract the tape inwardly away from the shelf.

7. The transport system of claim 1 wherein the plow is configured to slide between the first position and the second position along a path that is above and parallel to the second platform.

8. The transport system of claim 1 wherein the plow is a wall arranged perpendicular to the second platform on the carrier.

9. A transport system for moving a container comprising:
a shelf including a first platform and at least one first magnet;
a moveable carrier including a second platform and a plow with at least one second magnet, the carrier configured to position the second platform adjacent to and parallel with the first platform, the plow configured to move relative to the second platform between a first position and a second position, wherein the plow is positioned above the second platform of the carrier when in a first position and is positioned above the first platform of the shelf when in the second position; and
a container including a first magnetic surface area and a second magnetic surface area, wherein the at least one first magnet of the shelf engages the first magnetic surface area when the container is positioned on the shelf, and wherein the at least one second magnet engages the second magnetic surface area when the plow engages the container, the plow configured to push the container from the carrier to the shelf when moving from the first position to the second position, and the plow configured to pull the container from the shelf to the carrier when moving from the second position to the first position.

10. A transport system for moving a container comprising:

a shelf including a first platform and at least one first magnet;

a moveable carrier including a second platform and a plow with at least one second magnet, the carrier configured to position the second platform adjacent to and parallel with the first platform, the plow configured to move relative to the second platform between a first position and a second position; and a container including a first magnetic surface area and a second magnetic surface area, wherein the at least one first magnet of the shelf engages the first magnetic surface area when the container is positioned on the shelf, and wherein the at least one second magnet engages the second magnetic surface area when the plow engages the container, the plow configured to push the container from the carrier to the shelf when moving from the first position to the second position, and the plow configured to pull the container from the shelf to the carrier when moving from the second position to the first position, wherein the container is a box with an open top, wherein the first magnetic surface area is provided by a first ferromagnetic plate in a floor of the box, and wherein the second magnetic surface area is provided by a second ferromagnetic plate in a side of the box.

11. The transport system of claim 10 wherein the shelf is one shelf of a shelf unit.

12. The transport system of claim 10 wherein the shelf is one shelf of a cartridge configured for placement in a cartridge delivery vehicle.

13. A method for moving a container holding a consumer product, the method comprising:

moving a carrier adjacent to a shelf such that a carrier platform is adjacent and parallel to a shelf platform, the shelf including at least one first magnet and the carrier including a plow and at least one second magnet;

moving a plow of the carrier from a first position above the carrier platform to a second position above the shelf platform;

magnetically decoupling the container from the shelf platform, wherein the container includes a first magnetic surface area and a second magnetic surface area, wherein the at least one first magnet of the shelf is configured to engage the first magnetic surface area when the container is positioned on the shelf, wherein the at least one second magnet is configured to engage the second magnetic surface area when the plow engages the container, and wherein the plow is configured to push the container from the carrier to the shelf when moving from the first position to the second position;

magnetically coupling the container to the plow; and moving the plow from the second position above the shelf platform to the first position above the carrier platform such that the plow pulls the magnetically coupled container from the shelf platform to the carrier platform.

14. The method of claim 13 wherein magnetically decoupling the container occurs while moving the plow to the position above the shelf platform.

15. The method of claim 14 wherein magnetically decoupling the container from the shelf platform includes moving permanent magnets away from the shelf platform such that the permanent magnets are no longer magnetically coupled to a magnetic surface area on a bottom of the container.

16. The method of claim 15 wherein magnetically coupling the container to the plow includes energizing electromagnets such that the electromagnets are magnetically coupled to a magnetic area on a side of the container.

17. The method of claim 16 wherein the container is a box, wherein the first magnetic surface area is provided by a ferromagnetic plate on the bottom of the box, and wherein the second magnetic surface is provided by a ferromagnetic plate on the side of the box.

18. The method of claim 17 wherein the box is open at a top and the consumer product is exposed within the box.

19. The method of claim 13 wherein the shelf is a first shelf, the method further comprising:

moving the carrier adjacent to a second shelf such that the carrier platform is parallel to a second shelf platform;

moving the plow of the carrier from the position above the carrier platform to a position above the second shelf platform such that the plow pushes the magnetically coupled container from the carrier platform to the second shelf platform;

magnetically decoupling the container from the plow;

magnetically coupling the container to the second shelf platform;

moving the plow from the position above the second shelf platform to the position above the carrier platform; and moving the carrier away from the second shelf.

20. The transport system of claim 10 wherein:

shelf includes a shelf slot arranged in the first platform;

the carrier includes a carrier slot arranged in the second platform; and the plow is connected to a carriage configured to move between the carrier slot and the shelf slot.

* * * * *